(12) United States Patent
Miller et al.

(10) Patent No.: US 10,003,467 B1
(45) Date of Patent: *Jun. 19, 2018

(54) CONTROLLING DIGITAL CERTIFICATE USE

(71) Applicant: Amazon Technologies, Inc., Seattle, WA (US)

(72) Inventors: Derek Del Miller, Austin, TX (US); Nachiketh Rao Potlapally, Arlington, VA (US); Rahul Gautam Patel, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/673,570

(22) Filed: Mar. 30, 2015

(51) Int. Cl.
*H04L 29/06* (2006.01)
*H04L 9/32* (2006.01)
*G06F 21/57* (2013.01)
*H04L 9/30* (2006.01)

(52) U.S. Cl.
CPC .......... *H04L 9/3268* (2013.01); *G06F 21/575* (2013.01); *H04L 9/30* (2013.01)

(58) Field of Classification Search
CPC ........ H04L 9/3268; H04L 9/30; G06F 21/575
See application file for complete search history.

(56) References Cited

U.S. PATENT DOCUMENTS

| | | | |
|---|---|---|---|
| 5,844,986 A | 12/1998 | Davis | |
| 6,085,320 A | 7/2000 | Kaliski, Jr. | |
| 6,708,273 B1 | 3/2004 | Ober et al. | |
| 7,069,452 B1 | 6/2006 | Hind et al. | |
| 7,379,549 B2 | 5/2008 | Pelly et al. | |
| 7,434,263 B2 | 10/2008 | Lampson et al. | |
| 7,543,139 B2 | 6/2009 | Camenisch et al. | |
| 7,802,092 B1 | 9/2010 | Kelly et al. | |
| 8,230,231 B2 | 7/2012 | Freeman et al. | |
| 8,291,229 B2 | 10/2012 | Dahmen et al. | |
| 8,458,459 B2 | 6/2013 | Lieber | |
| 8,484,451 B2 * | 7/2013 | Sibert | G06F 21/575 713/1 |
| 8,560,823 B1 * | 10/2013 | Aytek | G06F 8/665 713/191 |
| 8,819,839 B2 | 8/2014 | Henry et al. | |
| 8,972,730 B2 | 3/2015 | Schmit et al. | |
| 9,015,837 B1 | 4/2015 | Petkov et al. | |
| 9,055,059 B1 * | 6/2015 | Bhalerao | H04L 63/0823 |

(Continued)

OTHER PUBLICATIONS

U.S. Appl. No. 14/574,299, filed Dec. 17, 2014, Titled: Reduced Overhead for Cryptographic Operations.

(Continued)

*Primary Examiner* — Mohammad A Siddiqi
(74) *Attorney, Agent, or Firm* — Kilpatrick Townsend & Stockton LLP

(57) ABSTRACT

A computing device includes a processor and a persistent memory for storing information about a first public key associated with a first asymmetric key pair for authenticating the source of a digital certificate. The computing device also includes a second memory for storing one or more current certificate version indicators, each associated with a corresponding digital certificate, and the version indicator is used by the processor to determine the trust of the corresponding digital certificate.

20 Claims, 19 Drawing Sheets

(56) References Cited

U.S. PATENT DOCUMENTS

| | | | |
|---|---|---|---|
| 9,305,185 B1 | 4/2016 | Pedersen et al. | |
| 9,479,340 B1* | 10/2016 | Miller | H04L 9/3268 |
| 2001/0002487 A1 | 5/2001 | Grawrock et al. | |
| 2002/0199110 A1 | 12/2002 | Kean et al. | |
| 2003/0097579 A1 | 5/2003 | England et al. | |
| 2004/0025010 A1* | 2/2004 | Azema | G06F 21/10 |
| | | | 713/156 |
| 2004/0025027 A1* | 2/2004 | Balard | G06F 21/31 |
| | | | 713/183 |
| 2004/0125949 A1 | 7/2004 | Seifert | |
| 2005/0005286 A1 | 1/2005 | Koskela et al. | |
| 2005/0132182 A1 | 6/2005 | Challener et al. | |
| 2005/0160476 A1* | 7/2005 | Kakii | H04L 9/3273 |
| | | | 726/5 |
| 2006/0256967 A1* | 11/2006 | Beuque | 380/263 |
| 2007/0083750 A1 | 4/2007 | Miura et al. | |
| 2007/0130439 A1* | 6/2007 | Andersson | G06F 21/575 |
| | | | 711/200 |
| 2007/0180230 A1 | 8/2007 | Cortez et al. | |
| 2008/0075284 A1 | 3/2008 | Ellison et al. | |
| 2009/0031141 A1 | 1/2009 | Pearson et al. | |
| 2009/0208003 A1 | 8/2009 | Matsukawa et al. | |
| 2010/0048296 A1* | 2/2010 | Adiraju | G06F 21/51 |
| | | | 463/29 |
| 2010/0185845 A1* | 7/2010 | Takayama | G06F 21/575 |
| | | | 713/2 |
| 2010/0241852 A1 | 9/2010 | Sela et al. | |
| 2011/0055585 A1* | 3/2011 | Lee | H04L 9/0844 |
| | | | 713/183 |
| 2011/0219227 A1 | 9/2011 | Sharif et al. | |
| 2012/0210124 A1* | 8/2012 | Lieber | H04L 9/0825 |
| | | | 713/158 |
| 2013/0042117 A1* | 2/2013 | Birtwhistle | G06F 19/3412 |
| | | | 713/182 |
| 2013/0070922 A1 | 3/2013 | Helms et al. | |
| 2013/0073856 A1* | 3/2013 | Sherkin | H04L 9/006 |
| | | | 713/176 |
| 2014/0052989 A1 | 2/2014 | Jones et al. | |
| 2014/0059356 A1 | 2/2014 | Nesnow et al. | |
| 2014/0164776 A1 | 6/2014 | Hook et al. | |
| 2014/0201540 A1 | 7/2014 | Li et al. | |
| 2014/0281502 A1* | 9/2014 | Keung Chan | H04L 9/3265 |
| | | | 713/157 |
| 2014/0331064 A1* | 11/2014 | Ballesteros | G06F 12/1408 |
| | | | 713/193 |
| 2015/0154031 A1 | 6/2015 | Lewis | |
| 2015/0172052 A1 | 6/2015 | Battistello et al. | |
| 2015/0186668 A1 | 7/2015 | Whaley et al. | |
| 2015/0358158 A1 | 12/2015 | Fadaie et al. | |
| 2016/0105288 A1 | 4/2016 | Logue | |
| 2016/0248585 A1 | 8/2016 | Yajima et al. | |

OTHER PUBLICATIONS

U.S. Appl. No. 14/658,136, filed Mar. 13, 2015, Titled: Updating Cryptographic Key Pair.

U.S. Appl. No. 14/658,137, filed Mar. 13, 2015, Titled: Updating Encrypted Cryptographic Key.

U.S. Appl. No. 14/673,585, filed Mar. 30, 2015, Titled: Controlling Use of Encryption Keys.

* cited by examiner

CONTROLLING DIGITAL CERTIFICATE USE

CROSS-REFERENCE TO RELATED APPLICATION

This application is related to U.S. patent application Ser. No. 14/574,299, entitled "REDUCED OVERHEAD FOR CRYPTOGRAPHIC OPERATIONS," filed Dec. 17, 2014, U.S. patent application Ser. No. 14/658,137, entitled "UPDATING ENCRYPTED CRYPTOGRAPHIC KEY," filed Mar. 13, 2015, U.S. patent application Ser. No. 14/658,136, entitled "UPDATING CRYPTOGRAPHIC KEY PAIR," filed Mar. 13, 2015, and U.S. patent application Ser. No. 14/673,585, entitled "CONTROLLING USE OF ENCRYPTION KEYS," filed Mar. 30, 2015, now U.S. Pat. No. 9,479,340, commonly owned and the contents of which are incorporated in their entirety by reference herein.

BACKGROUND

As an increasing amount of information is being transmitted and stored electronically, and as the number of transactions performed electronically through networks increases, there is an ever increasing need to protect sensitive information in an electronic environment. This includes not only securing the storing and transmitting of information, but also securing access to the information. A common approach is to encrypt information using an encryption algorithm or cipher to encode information such that the information can only be decrypted or otherwise interpreted using a cryptographic key.

Digital certificates are often used to deliver public key values to systems. These certificates and keys can be vulnerable to attacks and can become compromised. Therefore, it is desirable to reduce the security risks associated with updating digital certificates and cryptographic keys.

BRIEF DESCRIPTION OF THE DRAWINGS

Various embodiments in accordance with the present disclosure will be described with reference to the drawings, in which.

DETAILED DESCRIPTION

Figure 1:
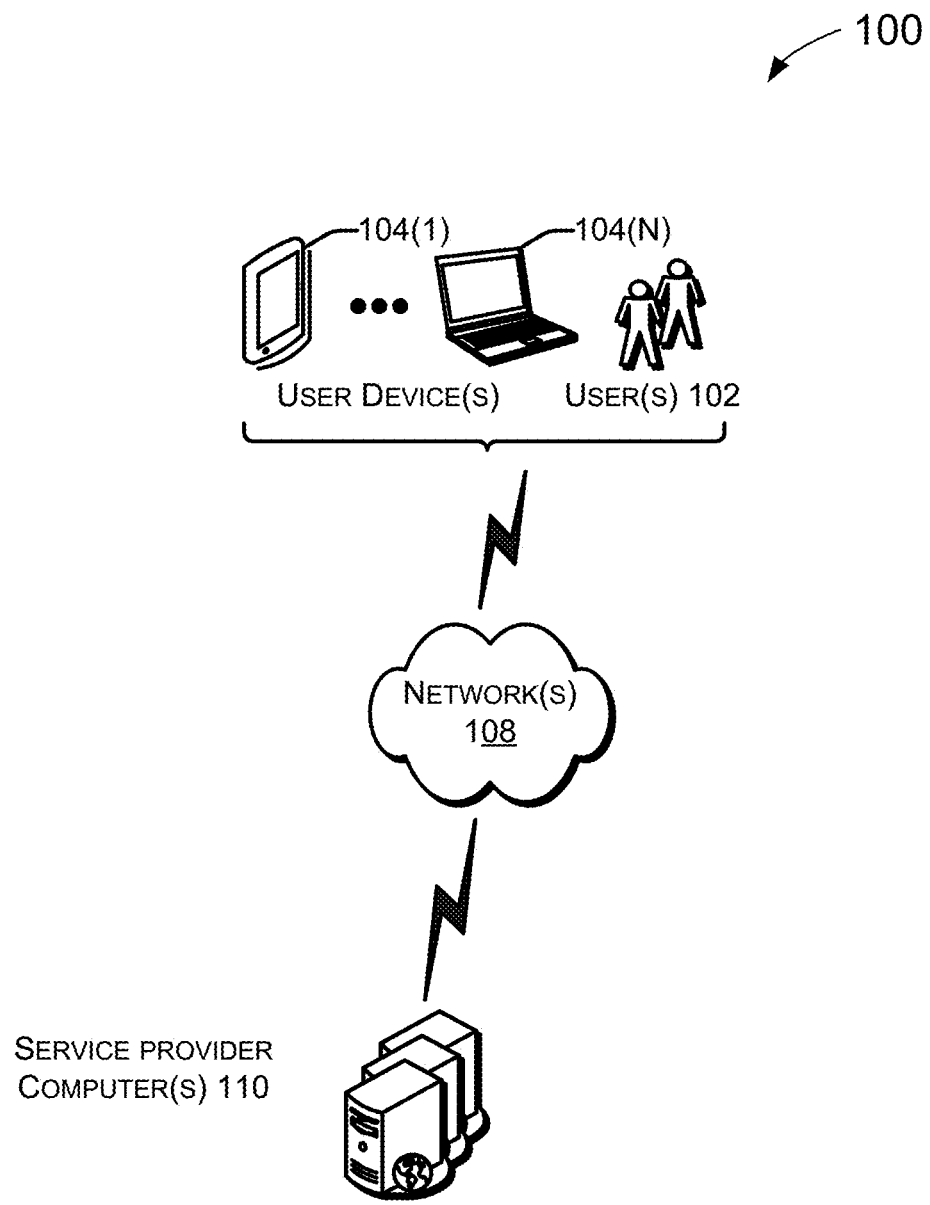
FIG. 1 illustrates an exemplary architecture for features and systems described herein that includes one or more service provider computers and/or a user device connected via one or more networks, according to at least one exemplary embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a silicon product, secret cryptographic keys are often stored in fuses on the device. In some devices, such as a processor or SoC (system-on-chip), each chip often has an asymmetric cryptographic key pair (including a private key and a public key) and a signed certificate for performing cryptographic functions, and other device-specific information stored in fuses. The device can also have a root public key for secure communication with a provisioning server. The root public key is considered to be trusted because it is burned into fuses in the device, or because it is integrated into the system boot ROM. In some applications, a system may receive additional public keys that are delivered with a trusted key certificate. Once the certificate has been authenticated, the system can trust items (e.g., certificates, firmware binaries) that can be authenticated with any public keys that may be included in extensions in that certificate.

Under certain circumstances, it may become desirable to replace the cryptographic keys in a computing device after the device has been in operation. For example, the current key may have been compromised. Alternatively, certain preset limits may have been reached. For example, the number of cryptographic operations performed using the first private key may have reached a preset number, or the elapsed time of using the first private key may have reached a preset limit. In a scenario where the private key associated with one of the public keys is somehow compromised, e.g., made public, the system vendor or the provisioning server will need to generate a new key pair to replace the compromised key, and to generate and distribute a new trusted key certificate and associated signed binaries and sub-certificates. However, this practice has its limitations. For example, an attacker in possession of a copy of the old trusted key certificate can then sign any firmware binaries using the compromised private key. Existing systems will still trust those binaries as long as they are loaded along with the original (compromised) trusted key certificate. Therefore, there is a need for a secure method for updating cryptographic keys.

Embodiments of the disclosed technologies add a "version number" extension to the certificates loaded by a system. This version number corresponds to a value burned into firmware programmable fuses on the device. If the version in a given certificate is less than the value stored in the corresponding fuses, the certificate will not be trusted by the system. If the version in a given certificate is equal to or higher than the value stored in the corresponding fuses, the certificate will be trusted by the system. In some embodiments, if the version in a received certificate is greater than the value stored in the fuses, the firmware will write a new value to the firmware programmable fuses, thus preventing any certificates with lower version numbers from being trusted. The version update function can be controlled by a system administrator or another trusted entity. For example, in some embodiments, the version number is only updated with the authorization from a system administrator or another trusted entity.

Some embodiments of the disclosed technologies also provide version numbers for specific keys in a similar manner. In this case, the trusted key certificate will contain version numbers for each of the keys it includes, and there will be corresponding fuses containing version numbers for each of the keys included in the system. Before trust is granted to a given key, its version number is checked against the version number in the fuses. In the above examples, version numbers are provided to both the certificate and the key. In some embodiments, a version number can be provided to either the digital certificate or the key, but not both. Thus, embodiments of the disclosed technologies provide various methods and systems for replacing digital certificates and cryptographic keys.

FIG. 1 illustrates an exemplary architecture for features and systems described herein that includes one or more service provider computers and/or a user device connected via one or more networks, according to at least one exemplary embodiment. In architecture 100, one or more users 102 may utilize user computing devices 104(1)-(N) (collectively, user devices 104) to access applications provided by, e.g., a web browser or mobile device application, via one or more networks 108. In some aspects, these applications may be hosted, managed, and/or provided by a computing resources service or service provider. One or more service provider computers 110 may provide a native application which is configured to run on user devices 104 which user(s) 102 may interact with.

As more information is being stored and more transactions are being executed electronically through various networks, there is an ever increasing need for secure storing and transmitting of sensitive information in an electronic environment. In addition, the devices connected to a network need to provide secure identity information and be authenticated by the network. A common approach is to encrypt information using an encryption algorithm or cipher to encode information such that the information can only be decrypted or otherwise interpreted using cryptographic keys.

Modern semiconductor integrated circuit computing devices, e.g., processors or SoCs, often are manufactured with device-specific information, such as device identification, stored in an on-chip non-volatile memory, also referred to as persistent memory, such that the secure data are retained when the device power is turned off. These device-specific data are often stored in fuses that are burnt in a later or final stage in device manufacturing. In security-sensitive applications where encryptions are desired, the information stored on-chip can include, for example, cryptographic keys and a digital certificate. Fuses or fuse-based memories are examples of immutable persistent memories whose content cannot be altered. Other examples of immutable persistent memories can include read-only-memory (ROM).

Depending on the cryptographic algorithm, the cryptographic keys can require thousands of fuses, which can occupy significant die area in an integrated circuit. Moreover, the fuse programming or burning process tends to be time-consuming and can increase the manufacturing cost of the device. Therefore, it is desirable to reduce the on-chip storage of cryptographic information for a device. Embodiments of the disclosed technologies include techniques for storing a reduced number of bits on the processor for performing cryptographic operations. According to some embodiments, two different cryptographic techniques are used to reduce the number of on-chip fuse bits in a device, as described in more detail below, with reference to FIG. 2.

In encryption, the message or information, referred to as plaintext, is encrypted using an encryption algorithm, generating a ciphertext, or encrypted message, that can only be read if decrypted. An encryption scheme usually uses a pseudo-random encryption key generated by an algorithm. An authorized recipient can easily decrypt the message with the key provided by the originator, but not unauthorized interceptors. In symmetric-key schemes, the encryption and decryption keys are the same. Thus, communicating parties must have the same key before they can achieve secret communication. On the other hand, in public-key encryption schemes, two keys are used: one for encryption and one for decryption. For example, a private encryption key can be used to encrypt messages, which can only be read by receiving parties in possession of a published decryption key. Alternatively, an encryption key can be published for multiple users to use and encrypt messages. However, only the receiving party has access to the decryption key that enables encrypted messages to be read.

Figure 2:
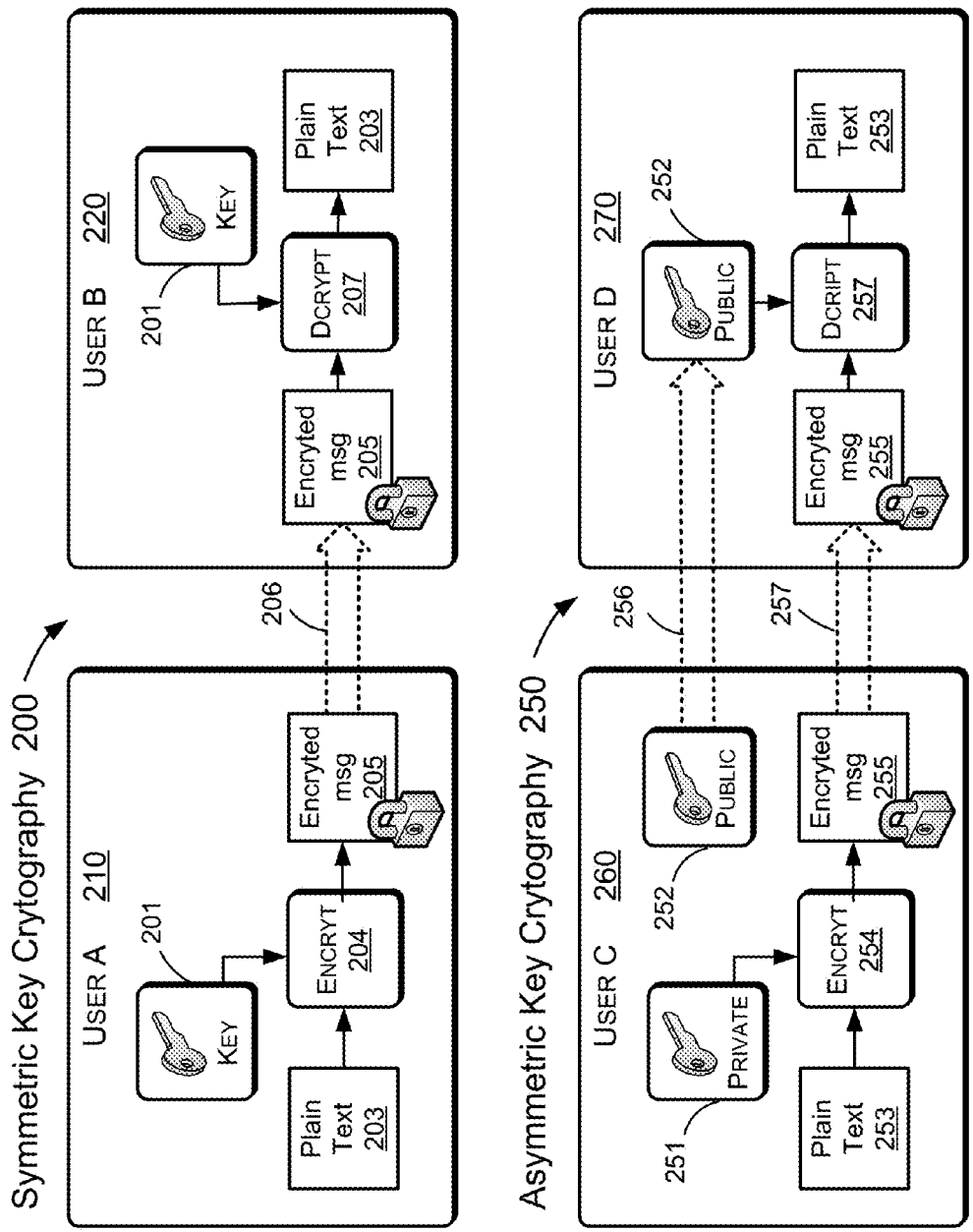
FIG. 2 illustrates cryptographic schemes using symmetric and asymmetric keys according to one exemplary embodiment.

FIG. 2 illustrates cryptographic schemes using symmetric key and asymmetric keys, according to an exemplary embodiment. An example of symmetric key cryptography 200 is shown in FIG. 2, in which user A (210) and user B (220) both have the same secret key 201. In this example, user A (210) encrypts plain text 203 using key 201 in an encryption process 204 to generate encrypted message 205. User A (210) then sends encrypted message 205 to user B (220) using a transmission process 206. Upon receiving the encrypted message 205, user B decrypts it using the same key 201 in a decryption process 207 to obtain the plain text 203.

In FIG. 2, an example of asymmetric key cryptography is shown as 250, in which user C (260) has both a private key 251 and a public key 252. In this example, user C can send the public key 252 to user D (270) using a transmission process 256. User C (260) encrypts a plain text 253 using an encryption process 254 to generate an encrypted message 255. User C then sends encrypted message 255 to user D (270) using a transmission process 257. In some cases, transmission processes 256 and 257 can be the same process. Upon receiving the encrypted message 255, user D decrypts it using the public key 252 in a decryption process 257 to obtain the plain text 253.

There are many symmetric key cryptographic algorithms or schemes. The Advanced Encryption Standard (AES) is a symmetric block cipher ratified as a standard by National Institute of Standards and Technology (NIST) of the United States. AES is based on the Rijndael cipher, which uses a design principle known as a substitution-permutation network, a combination of both substitution and permutation. The Rijndael specification is specified with block and key sizes that may be any multiple of 32 bits, both with a minimum of 128 and a maximum of 256 bits. The Rijndael algorithm involves several rounds of operation using round keys derived from the cipher key using Rijndael's key schedule. The operations can include substitution, transposition, and mixing, etc. As described above, the same key is used in encryption as well as decryption.

In contrast, in asymmetric key cryptography, different keys are used for encrypting and decrypting a message. In this case, one key can be made public while the other is kept secure. This arrangement is often referred to as public key cryptography, and provides some distinct advantages over symmetric encryption; for example, the necessity of distributing secret keys to large numbers of users is eliminated, and the algorithm can be used for authentication as well as for cryptography. RSA (Rivest-Shamir-Adleman) is a public-key cryptosystem widely used for secure data transmission. The algorithm is based on mathematical manipulation of two large prime numbers and their product. Its strength is believed to be related to the difficulty of factoring a very large prime number.

A method for generating public and private keys will be described further below in connection with FIG. 6. In RSA, the public key consists of the modulus n and the public (or encryption) exponent e. The private key consists of the modulus n and the private (or decryption) exponent d, which is kept secret. The process is explained using an example of a public key holder sending an encrypted message to the private key holder. The encryption of a message M is formed by computation using the following formula, $$c \equiv m^e (\bmod n)$$

where m is an integer representation of the message M and $0 \leq m < n$, (n, e) is the public key, mod is a modulus function, and c is the ciphertext. The decryption of ciphertext c is carried out by computation according to the following formula, $$m \equiv c^d (\bmod n).$$

where d is the private key exponent. The decrypted integer representation m can be used to derive the original message M.

The security strength of the RSA scheme is related to its key size. It has been reported that to provide 128-bits of security for authentication using RSA, it would need to have 3072 bits for the private key and over 1 kB (over 8000 bits) for the certificate. Thus, a total of 12,000 or more bits would be necessary.

In the RSA algorithm, calculations are made modulo n, where n is a product of two large prime numbers p and q. 1,024-, 2,048- or 4,096-bit integers n are commonly used, making calculations very time-consuming. By using the Chinese remainder theorem, however, parts of the private key can be pre-computed and stored, and the private key calculations in the latter representation can be much faster.

Elliptic Curve Cryptography (ECC) is another public key scheme. In general, public-key cryptography is based on the intractability of certain mathematical problems. Early public-key systems, such as RSA, are secure assuming that it is difficult to factor a large integer composed of two or more large prime factors. For elliptic-curve-based protocols, it is assumed that finding the discrete logarithm of a random elliptic curve element with respect to a publicly known base point is infeasible. The security of ECC depends on the ability to compute a point multiplication and the inability to compute the multiplicand given the original and product points. The size of the elliptic curve determines the difficulty of the problem. The benefits offered by ECC are a smaller key size, reducing storage, and transmission requirements. For example, an elliptic curve group could provide the same level of security afforded by an RSA-based system with a large modulus and correspondingly larger key. For example, a 256-bit ECC public key has been reported to provide comparable security to a 3072-bit RSA public key. ECC can also offer faster private key operations, but public key operations can be slower than equivalent strength RSA.

In cryptography, a public key certificate (also known as a digital certificate or identity certificate, and will also be referred to as a "certificate" hereinafter) is an electronic document used to prove ownership of a public key. The certificate includes information about the key, information about its owner's identity, and the digital signature of an entity that has verified the certificate's contents are correct. In a typical public-key infrastructure (PKI) scheme, the signer is a certificate authority (CA). In other schemes, the signer can be the key's owner. Certificates are an important component of Transport Layer Security (TLS, sometimes called by its older name SSL), where they prevent an attacker from impersonating a secure website or other server. They are also used in other important applications, such as email encryption and code signing. For example, when sending out encrypted data, the sender often sends a digital certificate to distribute a public key. In connecting to a network, a device needs to provide a certificate to the network such that the network can authenticate the device.

A digital signature is a mathematical scheme for demonstrating the authenticity of a digital message or document. A valid digital signature gives a recipient reason to believe that the message was created by a known sender, such that the sender cannot deny having sent the message (authentication and non-repudiation) and that the message was not altered in transit (integrity). Digital signatures often employ a type of asymmetric cryptography. For messages sent through a non-secure channel, a properly implemented digital signature gives the receiver reason to believe the message was sent by the claimed sender. Digitally signed messages or documents may be anything representable as a bit string, including electronic mail, firmware binaries, or a message sent via some other cryptographic protocol.

Figure 3:
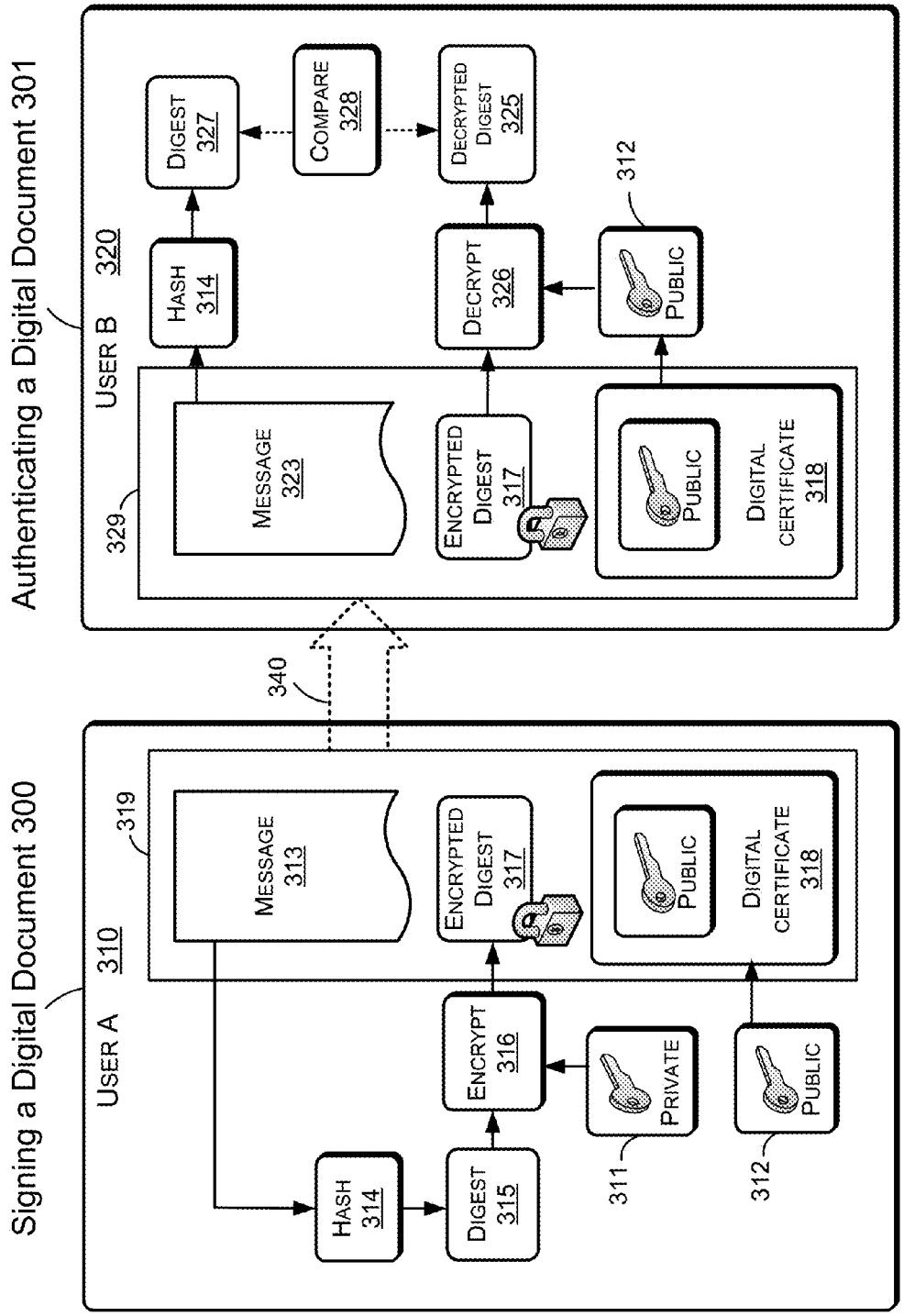
FIG. 3 illustrates a cryptographic scheme for generating and authenticating a digital certificate using asymmetric keys according to one exemplary embodiment.

FIG. 3 illustrates a cryptographic scheme for signing and authenticating a digital document using a digital certificate using asymmetric keys according to one exemplary embodiment. In FIG. 3, block 300 depicts the steps user A (310) takes to prepare a digitally signed digital document 319 including a message 313 for sending to user B (320). First, user A generates a private key 311 and a corresponding public key 312, using an asymmetric key generation algorithm, e.g., RSA. In an embodiment, a digital signature is an authentication mechanism that enables the creator of a message to attach a code that acts as a signature. As shown in FIG. 3, user A performs a hash function 314 on message 313 to produce a message digest 315. Next, user A encrypts message digest 315 using user A's private key 311 in an encryption process 316 to obtain an encrypted message digest 317, which is used as a digital signature. User A then forms the signed document 319 that includes message 313, digital signature 317 which is the encrypted message digest, and user A's digital certificate 318. User A can send signed document 319 to user B using a transmission process 340.

In FIG. 3, block 301 depicts the steps user B (320) takes to authenticate a received digital document 329. After receiving digital document 329, user B (320) uses the public key 312 contained in digital certificate 318 to decrypt the encrypted message digest 317 in a decryption process 326 to obtain a decrypted message digest 325. Based on the information provided by digital certificate 318, user B also performs hash function 314 on the received message 323 to obtain a new version of message digest 327. User B then compares the new message digest 327 with the decrypted message digest 325 using a comparison process 328. A match would indicate that decrypted message digest 325 was encrypted using user A's private key, a proof that it was sent by user A. Additionally, the matched message digests would indicate that the received message 323 is the same as the message 313 sent by user A. The integrity of the digital document can be established, and the authentication process is completed.

Figure 4:
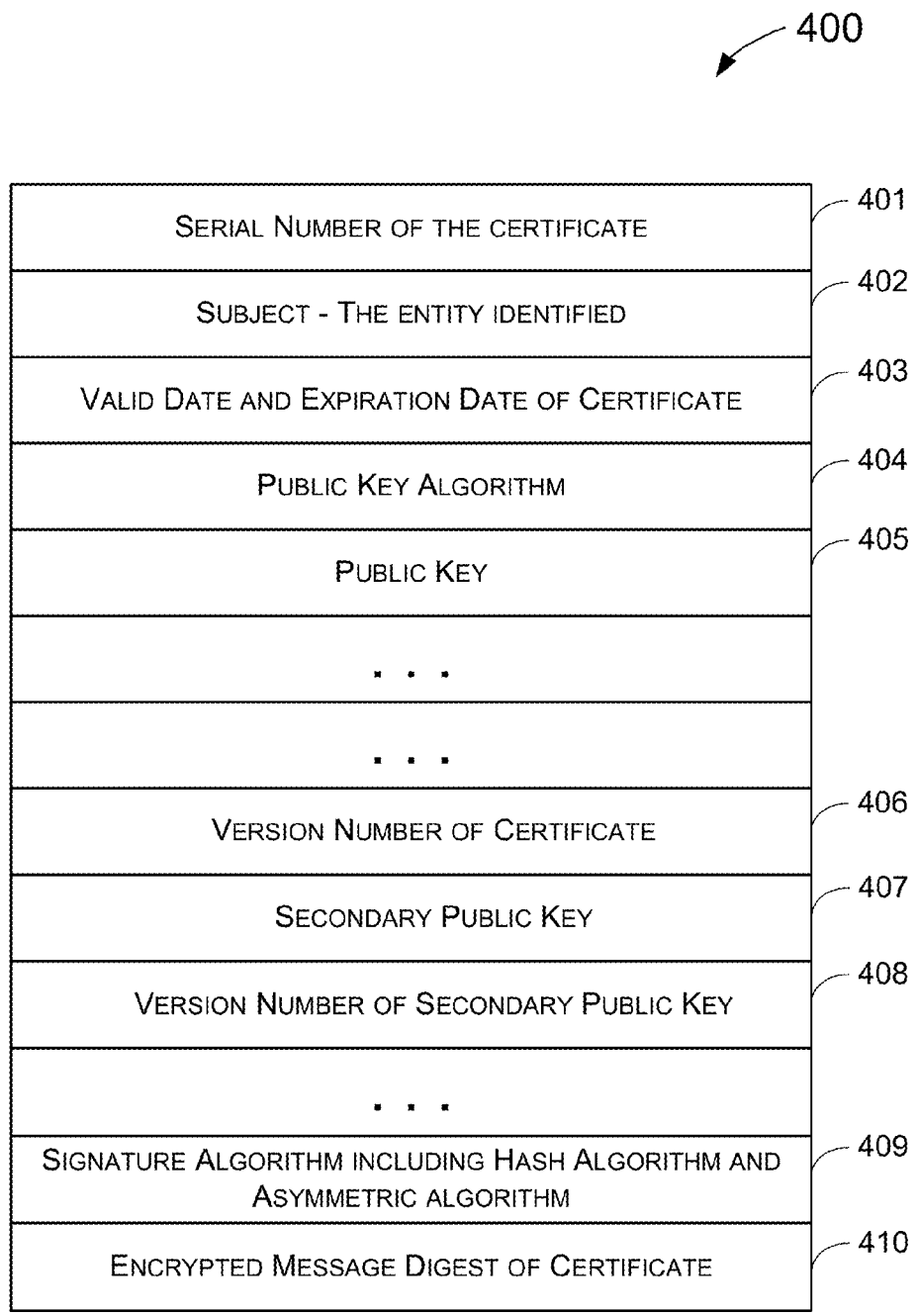
FIG. 4 illustrates contents of a digital certificate according to one exemplary embodiment.

FIG. 4 illustrates contents of a digital certificate according to an exemplary embodiment. As shown in FIG. 4, a digital certificate 400 is a certificate used to deliver a certificate version number, a new public key, and a public key version number from a provisioning system to a computing device. In an embodiment, certificate 400 can include the following fields:

Field 401—Serial number to uniquely identify the certificate;
Field 402—Subject showing the person or entity identified;
Field 403—Validation date and expiration date of the certificate;
Field 404—Public key algorithm;
Field 405—Public key;
Field 406—Version number of the digital certificate;
Field 407—Secondary public key to be delivered;
Field 408—Version number of the secondary public key;
Field 409—Signature algorithm;
Field 410—Encrypted message digest of the certificate.

In the above example, some fields are used for identification purposes. For example, field 401 includes a serial number to uniquely identify the certificate, and field 402 is a subject field showing the person or entity identified. In a certificate issued by a certificate authority (CA) to an entity, the subject field would show the identity and can also include contact information of the entity. In the example of FIG. 4, the certificate can be used to deliver a secondary public key or firmware binaries to a computing device, and field 402 can include identity information of a provisioning system or server. Field 403 includes a validation date and expiration date of the certificate, field 404 includes the public key algorithm and field 405 is the public key for the recipient of the certificate to authenticate the certificate. The public key algorithm can be any asymmetric cryptographic algorithm that the provisioning system has used to generate the asymmetric key pair. Field 406 can include a certificate version number of the digital certificate according to embodiments of the certificate. Field 407 includes a secondary public key to be delivered and field 408 includes a key version number of the secondary public key according to embodiments of the certificate. Field 409 includes the signature algorithm and field 410 includes an encrypted message digest of the certificate. The signature algorithm (409) can include a hash algorithm for generating the message digest and an asymmetric algorithm, e.g., RSA, for encryption. The encrypted message digest (410) is sometimes referred to as the certificate signature. Fields 409 and 410 are used for the computing device receiving the certificate to authenticate the certificate.

The above description of digital certificate 400 is merely an example of a digital certificate that can be used in embodiments of the disclosed technologies. However, one skilled in the relevant art will appreciate that the disclosed illustrative fields are not meant to be an exhaustive identification of all the fields required by or present in a certificate 400. Rather, illustrative fields have been identified, in a non-limiting manner, to facilitate illustration of one or more aspects of the disclosed technologies. Further, various modifications or changes in light thereof will be suggested to one skilled in the art. In some embodiments, digital certificate 400 is used for a provisioning server to deliver public keys and firmware binaries to a computing device. Therefore, the content and format can be defined by the provisioning server, and the firmware in the computing device is configured to interpret the certificate. The certificate can also include other information. For example, the certificate can also include the public key algorithm associated with the secondary public key.

In some embodiments, the digital certificate can be configured according to the x.509 standard. In such embodiments, the certificate version number associated with the digital certificate can be stored in an extension field in the digital certificate specified according to the x.509 standard. Similarly, the secondary public key and the key version number associated with the secondary public key can also be stored in an extension field in the digital certificate specified according to the x.509 standard.

Figure 5:
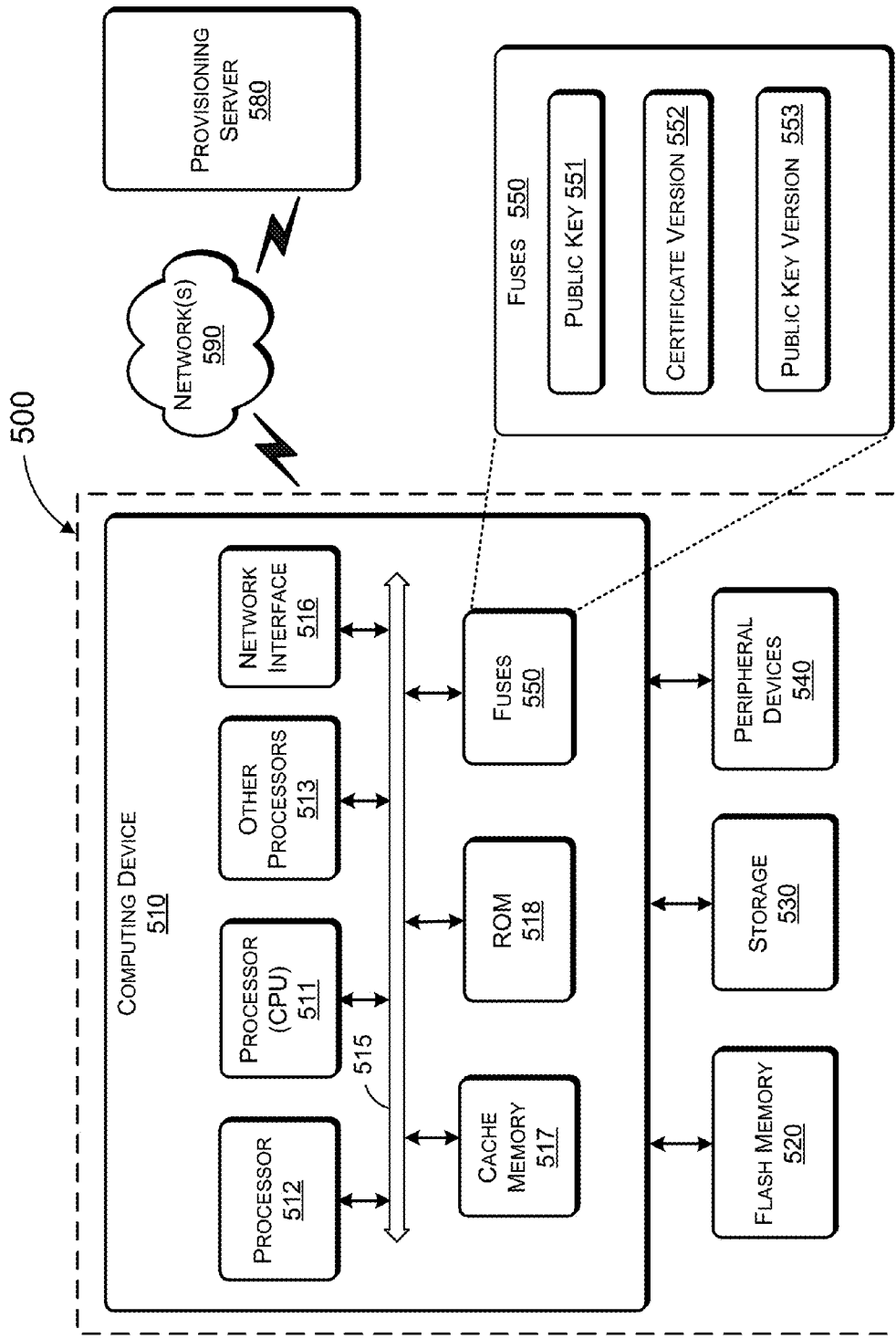
FIG. 5 illustrates a computing device including certificate and key version number checking according to one embodiment of the disclosed technologies.

FIG. 5 illustrates a computing device configured to handle certificate and key version numbers checking according to one embodiment of the disclosed technologies. However, one skilled in the relevant art will appreciate that the disclosed illustrative components are not meant to be an exhaustive identification of all the components required by or present in a system 500. Rather, illustrative components have been identified, in a non-limiting manner, to facilitate illustration of one or more aspects of the disclosed technologies. Still further, the illustrative components of system 500 can be considered logical in nature such that the physical implementation of one or more components can be varied or such that one or more of the logical components may be implemented in a virtualized manner. Additionally, one or more computing devices can share one or more of the illustrated components, such as processors, graphical processing units, memory, and the like.

In an illustrative embodiment, system 500 is associated with various hardware components, software components, and respective configurations that facilitate the implementation of security functions. For example, in one embodiment system 500 can include a computing device 510, e.g., a system-on-chip (SoC), built in a single integrated circuit (IC) chip, for carrying out the operation of computing device 500. As shown in FIG. 5, computing device 510 can have a processor (CPU) 511, a second processor 512, and other processors 513, all coupled to a communication channel 515. In some embodiments, processor 511 and/or processor 512 can be configured to perform security related functions, including encryption, decryption, and authentication, etc., according to various algorithms. It is noted that in embodiments of the disclosed technologies, a security processor is optional, as security related functions can be implemented by other means, for example, by computer code executed by one or more processors, by hardware, or combinations thereof. Computing device 510 can also have various memory units, such as cache memory 517, a ROM (read-only memory) 518, and fuse-based memory 550, also disposed on the same IC chip. In addition, computing device 500 can have multiple peripheral devices, such as flash memory 520 on a separate IC chip, other non-volatile storage devices 530, and other peripheral devices 540. In some embodiments, SoC or computing device 510 and flash memory 520 are separate IC chips disposed on the same system circuit board. The peripheral devices can include a network communication interface 516 for establishing communication channels between the computing device and one or more network based services or other computing devices, such as a cryptographic key provisioning system 580 through network(s) 590. In some embodiments, the peripheral devices may be implemented using multiple discrete hardware elements, such as multiple cards or other devices.

In FIG. 5, ROM 518, flash memory 520, and fuses 550 are examples of non-volatile memories, whereas ROM 518 and fuses 550 are an example of an immutable persistent memory that cannot be altered. ROMs or mask ROMs are factory programmable (e.g., can be programmed during fabrication), and typically are used for large-volume products not required to be updated after manufacture. For example, a boot ROM can include or locate boot loader software utilized to boot up system 500. In an embodiment, the ROM can include System Basic Input/Output System (SBIOS), which can include executable code, often referred to as firmware, that can be executed by one or more processors and used to cause components of system 500 to initialize and identify system devices such as the video display card, keyboard, mouse, hard disk drive, optical disc drive, and other hardware. In some embodiments, computing device 510 can also include firmware programmable fuses, an example of which is described below with reference to FIG. 6.

Another type of non-volatile memory, programmable read-only memory (PROM), can be altered after manufacture, but requires special programmer equipment, and data is stored by physically altering (burning) storage sites in the device. Yet another type of non-volatile memory, an electrically erasable programmable read-only memory (EEPROM), can be erased and programmed in-system. In FIG. 5, flash memory 520 may include flash memory chips, which are a type of EEPROM that can only erase one block or "page" at a time. It is a solid-state chip that maintains stored data without any external power source. Flash memory devices can offer high capacity and reasonable read/write speed, and mass production has lowered the cost of these commodity storage devices, making these chips a popular choice as secondary storage chips for processors.

Permanent device-specific information is often stored in a programmable read only memory (PROM) that can be programmed at a final test stage or in the system. Fuse-based PROMs can be programmed by electrically melting conductive traces made of a metal or polysilicon material (blowing microscopic fuses) to cause a conductive path to be broken. Alternatively, some PROMs operate by sending a current to change the electrical resistance of a material disposed between two conductors.

System 500 can also include additional components that are in communication with one or more of the illustrative components associated with system 500. Such components can include one or more controllers in combination with one or more peripheral devices 540, such as hard disks or other storage devices.

According to some embodiments of the disclosed technologies, computing device 510 (also referred to as an SoC) in FIG. 5 can include a persistent memory, such as fuses 550 (also referred to as fuse-based memory) or ROM 518, for storing information about a first public key 551 associated with a first asymmetric key pair, e.g. an RSA key pair. In some embodiments, the first public key can be provisioned in the computing device in the manufacturing process by a provisioning server. This public key is also referred to as a root public key. This public key is trusted by the system because it is burned into fuses in the device, or because it is integrated into the system boot ROM. Depending on the embodiment, the information about the first public key can be the public key itself, or information that can be used to derive the public key. The latter can include a hash of the public key that can be used to authenticate a public key provided with a digital certificate. In an embodiment, the information about the first public key can include a symmetric key stored in the persistent memory that can be used to decrypt an encrypted public key stored in a flash memory. In yet another embodiment, the information about the first public key can include prime numbers stored in the persistent memory that can be used to derive an asymmetric key pair that includes the first public key. Further details of the information for deriving the first public key are described in commonly owned U.S. patent application Ser. No. 14/574,299, filed Dec. 17, 2014, and U.S. patent application Ser. No. 14/658,137, filed Mar. 13, 2015, the content of which is incorporated herein by reference.

In some embodiments, computing device 510 can also have a second memory. In an embodiment, the second memory can be a fuse-based memory, such as fuses 550 in FIG. 5. In other embodiments, the secondary memory can be another memory, such as flash memory 520. The second memory is used for storing one or more current certificate version indicators 552, each associated with a corresponding digital certificate. In some embodiments, the second memory is also configured for storing one or more current key version indicators 553, each associated with a corresponding public key. Depending on the embodiment, this key can be the root public key 551. In embodiments of the disclosed technology, the processor is further configured to perform cryptographic operations using the secondary public key with the current key version number.

Figure 6:
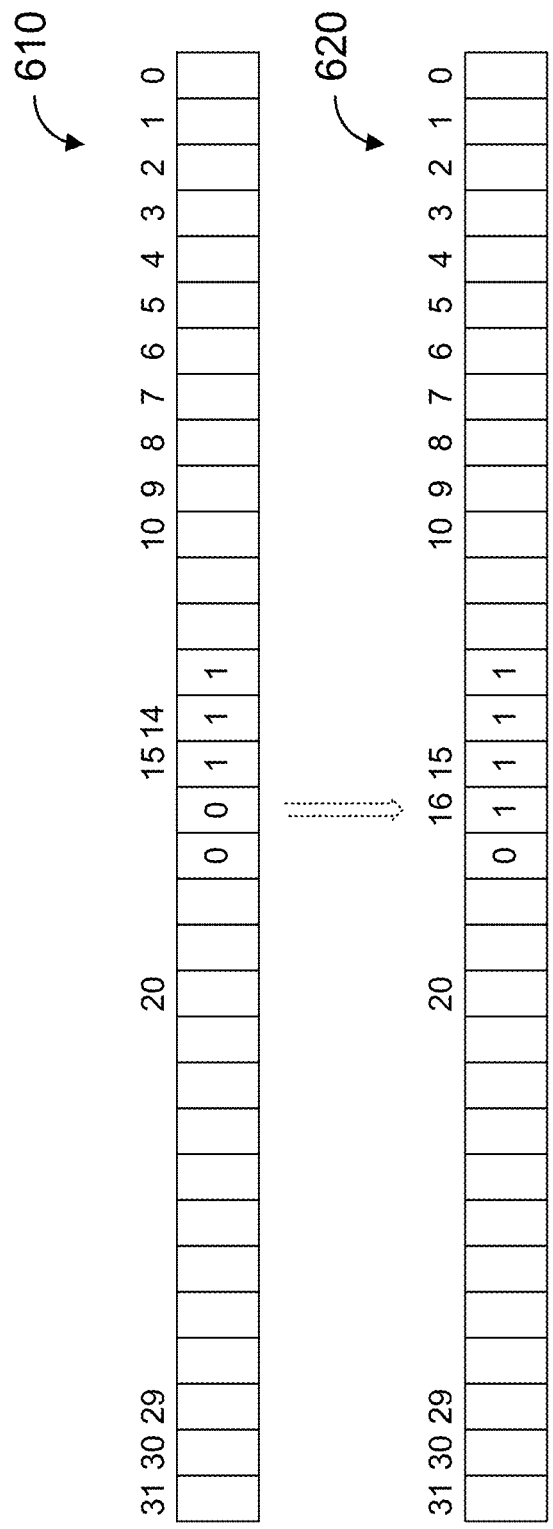
FIG. 6 illustrates bit fields for storing certificate and key version numbers according to one exemplary embodiment.

FIG. 6 illustrates bit fields for storing certificate and key version numbers according to one exemplary embodiment. In system 500 illustrated in FIG. 5, each of the current certificate version numbers can be stored in a bit field in a fuse-based memory, in which the highest bit in the bit field with a value of "1" indicates the lowest certificate version number to be trusted. Further, each of the current key version numbers can be stored in a bit field in the fuse-based memory, in which the highest bit in the bit field with a value of "1" indicates the lowest key version number to be trusted. As shown in FIG. 6, in bit field 610, since bit 15 is set, no version lower than 15 will be allowed to be loaded, and bits 14-0 will be ignored. If a new version is authenticated, the bit field can be updated to reflect the change. As shown in bit field 620, bit 16 is now set, and no version lower than 16 will be allowed to be loaded. Bits 15-0 will be ignored.

In some embodiments, the fuse-based device used to store the version numbers can be firmware programmable fuses, such as the bit field described above, and the firmware can control the burning of the fuses. Alternatively, in other embodiments, the version numbers can be stored in a flash memory. In these cases, the version numbers can be represented by binary numbers, and the version numbers can be updated by a counter and then stored in the flash memory.

Figure 7A:
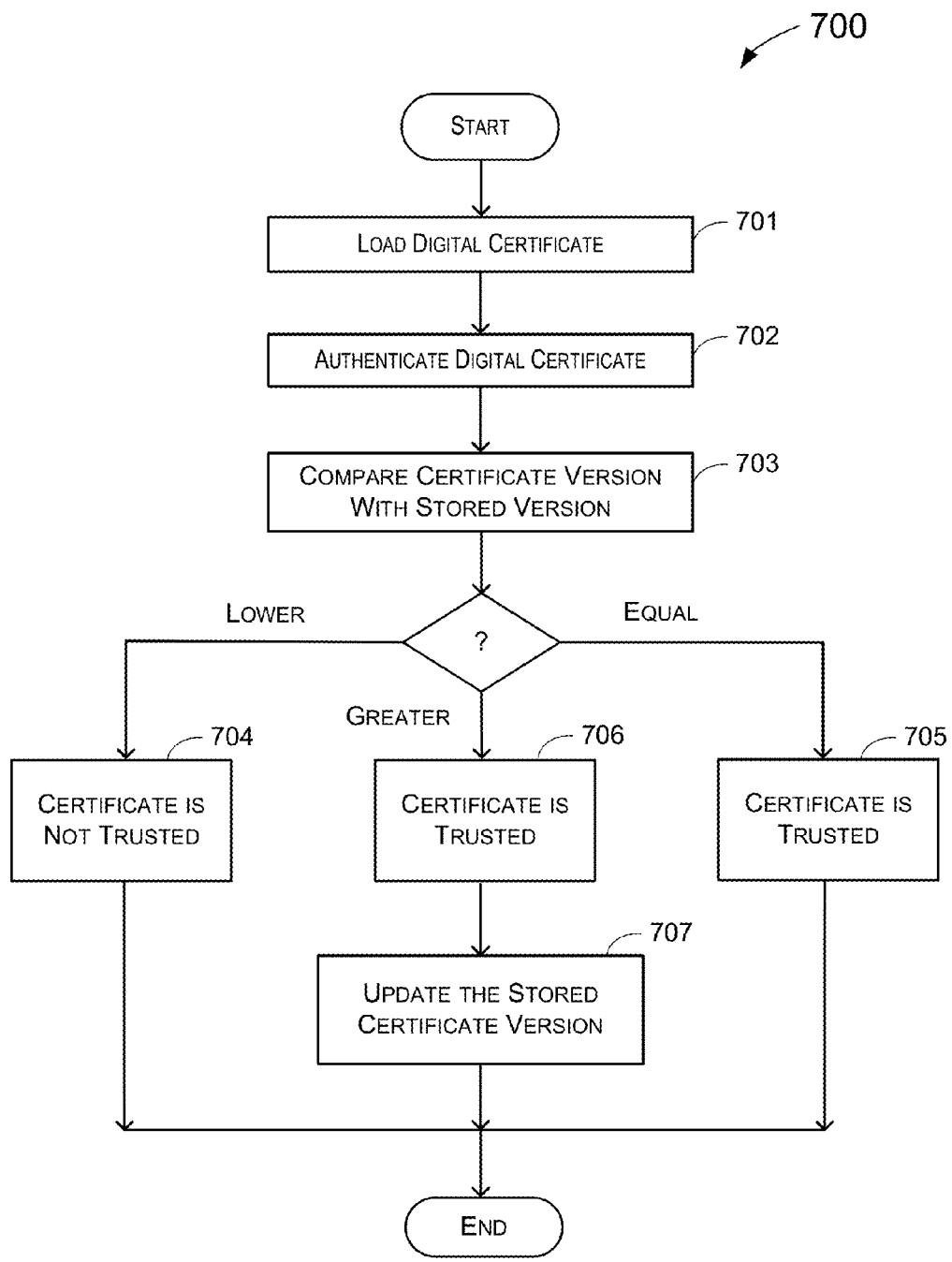
FIG. 7A is a flowchart illustrating a method for authenticating a digital certificate including a certificate version number according to one embodiment of the disclosed technologies.
Figure 7B:
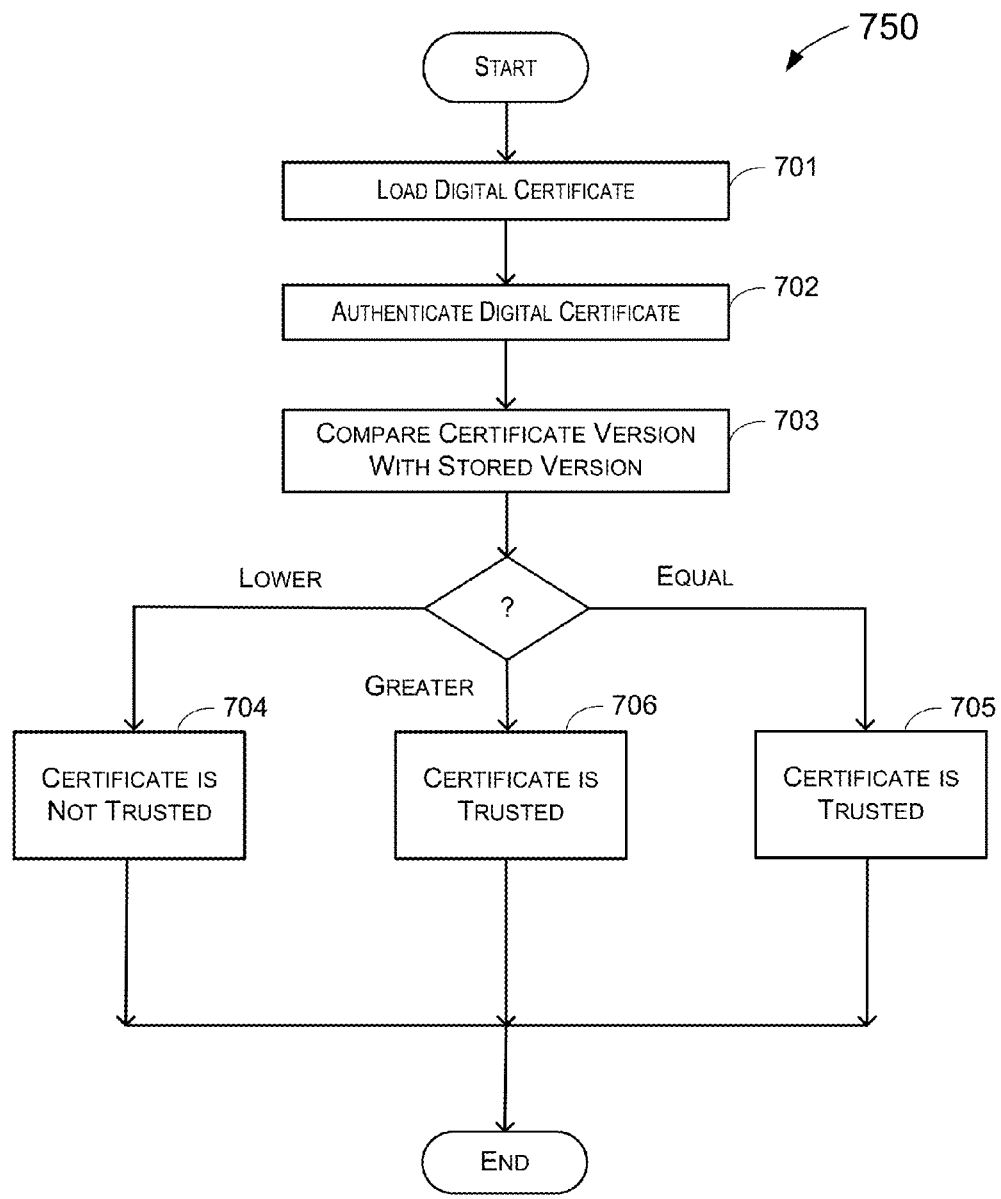
FIG. 7B is a flowchart illustrating a method for authenticating a digital certificate including a certificate version number according to another embodiment of the disclosed technologies.
Figure 7C:
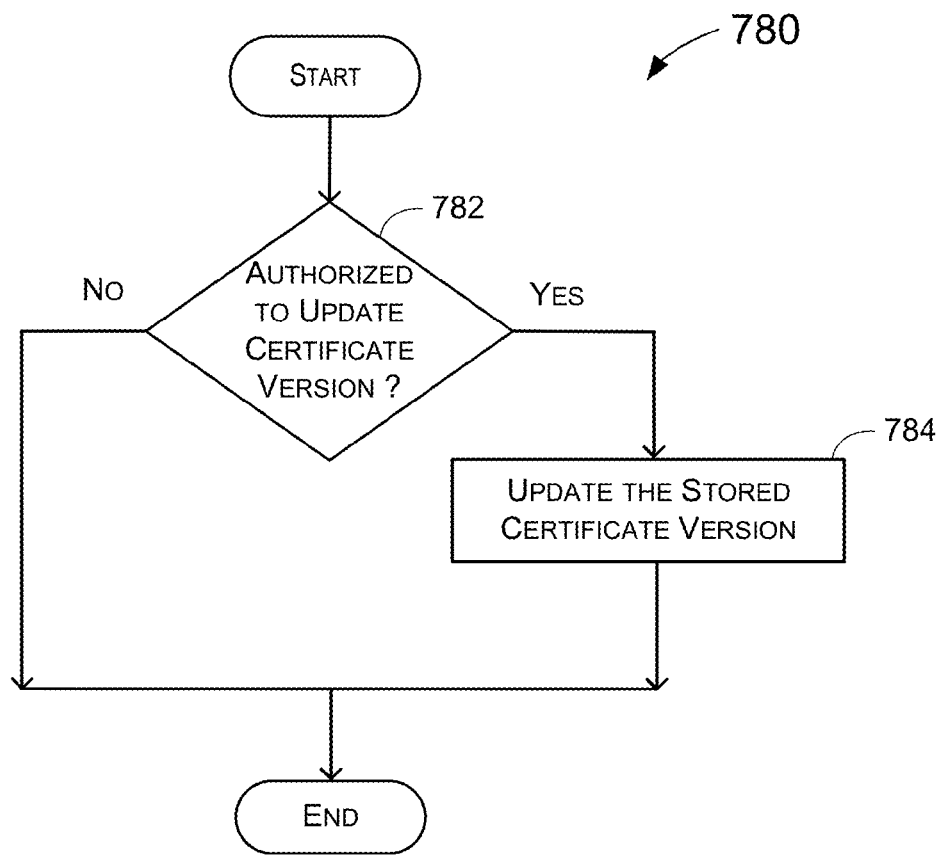
FIG. 7C is a flowchart illustrating a method for updating a certificate version number according to an embodiment of the disclosed technologies.

In some embodiments, one of the processors in FIG. 5 can be configured to perform a method of authenticating a digital certificate including a certificate version number as illustrated in the flowcharts in FIGS. 7A-7C. In some embodiments, a processor can be further configured to perform a method for authenticating a cryptographic key including a key version number as illustrated in the flowcharts in FIGS. 8A-8C.

FIG. 7A is a flowchart illustrating a method 700 for authenticating a digital certificate including a certificate version number according to an embodiment of the disclosed technologies. Method 700 is summarized below and explained with reference to FIGS. 4-6.

Process 701: Load a digital certificate with a certificate version indicator;
Process 702: Authenticate the digital certificate;
Process 703: Compare the certificate version indicator with a stored current version indicator;
Process 704: Determine the certificate is not a trusted certificate, if the new version indicator is lower;
Process 705: Determine the certificate is a trusted certificate, if the new version indicator is the same as the stored current version indicator;
Process 706: Determine the certificate is a trusted certificate, if the new version indicator is higher; and
Process 707: Update the stored current version indicator with the new version indicator.

In some embodiments, method 700 illustrated in the flowchart in FIG. 7A can be implemented using system 500 shown in FIG. 5. In an embodiment, method 700 can be carried out by computing device 510 in a secure boot process. For example, in process 701, processor 512 can be configured to load or read in a digital certificate from a memory, such as flash memory 520. In some embodiments, the certificate may have been received from a provisioning server and stored in the memory. The certificate can include information as listed in FIG. 4, e.g., a certificate version number and one or more secondary public keys, each with a corresponding key version number. In process 702, processor 512 is configured to authenticate the certificate. As illustrated in FIG. 3, the authentication process can include decrypting an encrypted message digest and comparing it with the digest obtained by hashing the message. In some embodiments, the decryption is performed using the root public key already stored in fuses 550. In process 703, after the certificate is authenticated, processor 512 is configured to compare the certificate version indicator with the corresponding stored current certificate version number in fuse-based memory 550 as illustrated in FIG. 5. Depending on the result of the comparison, processor 512 is configured to perform different operations. For example, in process 704, if the version indicator is lower than the stored current certificate version indicator, the processor determines that the digital certificate is not a trusted certificate. In process 705, if the version indicator is equal to the stored current certificate version indicator, the processor determines that the digital certificate is a trusted certificate. In process 706, if the version indicator is higher than the stored current certificate version indicator, the processor determines that the digital certificate is a trusted certificate, and further, in process 707, the processor updates the corresponding stored current certificate version indicator 551 in fuse-based memory 550 to reflect the new certificate version indicator in the digital certificate. In embodiments in which the version indicator is stored in a bit field, the update operation includes incrementing the version number by burning the next bit in the bit field.

FIG. 7B is a flowchart illustrating a method 750 for authenticating a digital certificate including a certificate version number according to an alternative embodiment of the disclosed technologies. Method 750 is summarized below.

Process 701: Load a digital certificate with a certificate version indicator;
Process 702: Authenticate the digital certificate;
Process 703: Compare the version indicator with a stored current version indicator;
Process 704: Determine the certificate is not a trusted certificate, if the new version indicator is lower;
Process 705: Determine the certificate is a trusted certificate, if the new version indicator is the same as the stored current version indicator;
Process 706: Determine the certificate is a trusted certificate, if the new version indicator is higher.

As shown above, method 750 is similar to method 700 outlined in the flowchart in FIG. 7A. Method 750 includes the same processes 701-706 depicted in FIG. 7A. A difference is that in method 750, a higher new version number of the trusted new certificate is not automatically updated in the stored current version indicator. Method 750 allows the current stored version number to remain valid, while a new version of the certificate can also being used.

As described above, methods 700 and 750 in FIGS. 7A and 7B illustrate operations carried out by a computing device during a secure boot process to authenticate a digital certificate with an associated version number. Depending on the embodiments, the stored current certificate version number may or may not be updated, as illustrated in FIGS. 7A and 7B, respectively. In method 750 shown in FIG. 7B, the version number is not updated at boot up time, and multiple versions of the certificate can be used. Subsequently, when the computing device is in operation after boot up, if the system administrator or another trusted entity determines that a permanent change of the stored version number is in order, the processor can then update the stored version indicator to reflect the new version number. For example, the version update may take place after the system administrator or another trusted entity decides that the new certificate is stable after a certain period of use.

FIG. 7C is a flowchart illustrating a method 780 for updating a certificate version number according to an embodiment of the disclosed technologies. In process 782 in FIG. 7C, the computing device checks to see if a command or authorization has been received from a trusted entity to update the stored version number. The trusted entity can include a system administrator or other trusted entity, which has decided to update the version number. In process 784, if such a command or authorization has been received, the computing device proceeds to update the stored version number. The version update operation is similar to process 707 of method 700 described above in connection with FIG. 7A. If no command or authorization is received, then the stored version number is not updated, and multiple versions of the certificate can be considered trusted.

Figure 8A:
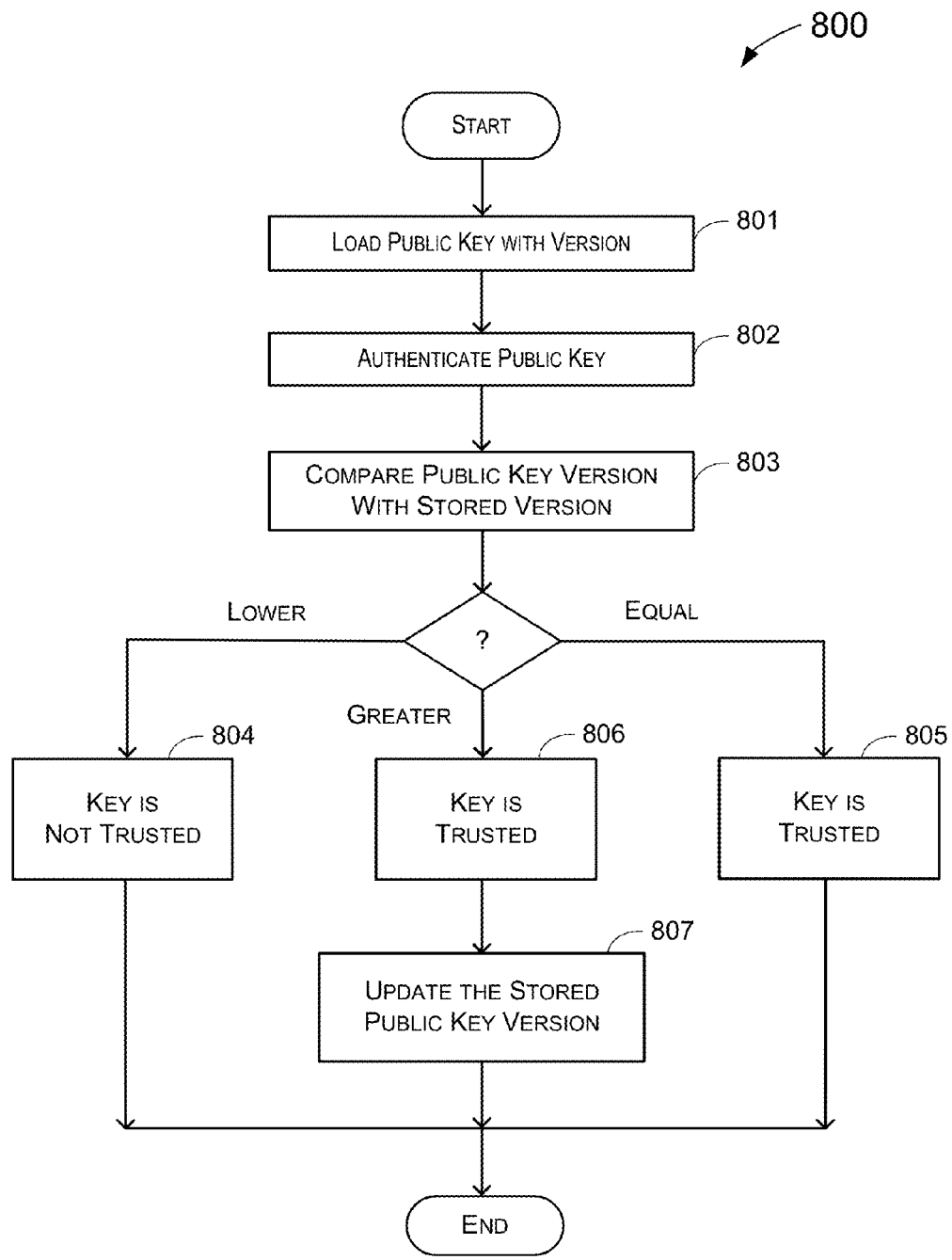
FIG. 8A is a flowchart illustrating a method for authenticating a cryptographic key including a key version number according to one embodiment of the disclosed technologies.

In some embodiments, after the certificate is determined to be a trusted certificate, the processor is configured to further check the key version indicator of the secondary public key delivered by the digital certificate. FIG. 8A is a flowchart illustrating a method for authenticating a cryptographic key including a key version number according to one embodiment of the disclosed technologies. Method 800 is summarized below and explained with reference to FIGS. 4-6.

Process 801: Load a public key with a key version indicator;
Process 802: Authenticate the public key using the first public key;
Process 803: Compare the key version indicator with a stored current key version indicator;
Process 804: Determine the public key is not a trusted key, if the new version indicator is lower;
Process 805: Determine the public key is a trusted key, if the new version indicator is the same as the stored current version indicator;
Process 806: Determine the public key is a trusted key, if the new version indicator is higher; and
Process 807: Update the stored current key version indicator with the new key version indicator.

Method 800 illustrated in the flowchart in FIG. 8A can be implemented using the computing device shown in FIG. 5 in a secure boot process. For example, in process 801, processor 512 can be configured to load or read in a public key with an associated key version indicator that is delivered with the digital certificate which has been authenticated. In this embodiment, the public key can be a secondary public key. In process 802, processor 512 is configured to authenticate the key. In some embodiments, the key may be authenticated in the same process for authenticating the digital certificate, in which case process 802 can be optionally skipped. In process 803, processor 512 is configured to compare the key version indicator with the corresponding stored current key version indicator in fuse-based memory 550 as illustrated in FIG. 5. Depending on the result of the comparison, processor 512 is configured to perform different operations. For example, in process 804, if the version indicator is lower than the stored current key version indicator, the processor determines that the key is not a trusted key. In process 805, if the version indicator is equal to the stored current key version indicator, the processor determines that the key is a trusted key. In process 806, if the version indicator is higher than the stored current certificate version indicator, the processor determines that the key is a trusted key, and further, in process 807, the processor updates the corresponding stored current key version indicator 554 in fuse-based memory 550 with the new key version indicator in the digital certificate. In some embodiments, the processor is further configured to store the secondary public key that has been determined as being trusted in the fuse-based memory.

Figure 8B:
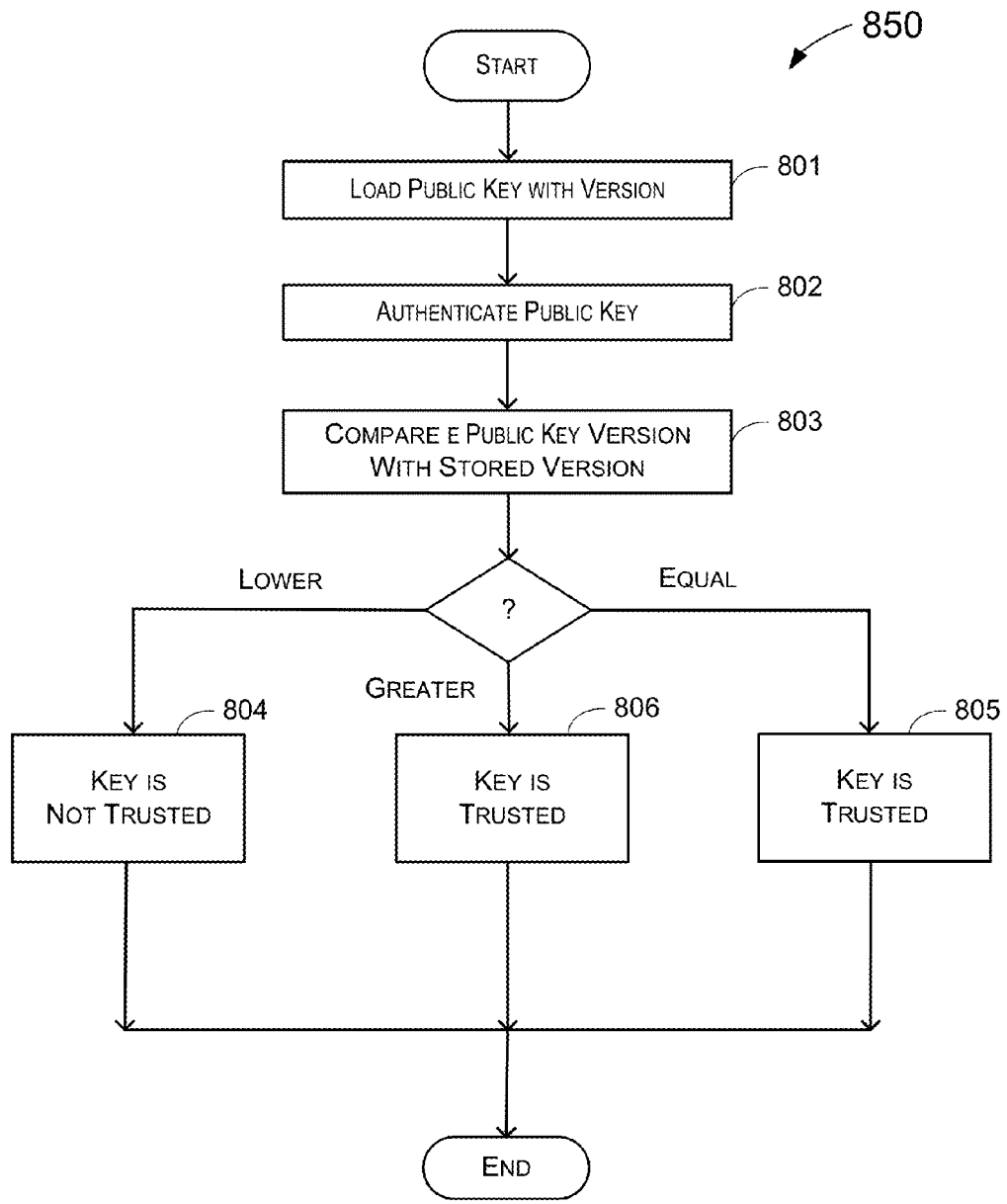
FIG. 8B is a flowchart illustrating a method for authenticating a cryptographic key including a key version number according to another embodiment of the disclosed technologies.

FIG. 8B is a flowchart illustrating a method 850 for authenticating a cryptographic key including a key version number according to another embodiment of the disclosed technologies. Method 850 is summarized below.

Process 801: Load a public key with a key version indicator;
Process 802: Authenticate the public key using the first public key;
Process 803: Compare the key version indicator with a stored current key version indicator;
Process 804: Determine the public key is not a trusted key, if the new version indicator is lower;
Process 805: Determine the public key is a trusted key, if the new version indicator is the same as the stored current version indicator;
Process 806: Determine the public key is a trusted key, if the new version indicator is higher;

As shown above, method 850 is similar to method 800 outlined in the flowchart in FIG. 8A. For example, method 850 includes the same processes 801-806 depicted in FIG. 8A. A difference is that, in method 850, a higher new version number of the trusted new key is not automatically updated in the stored current version indicator. Thus, method 850 allows the current stored version number to remain valid, while a new version of the key can also be used.

Figure 8C:
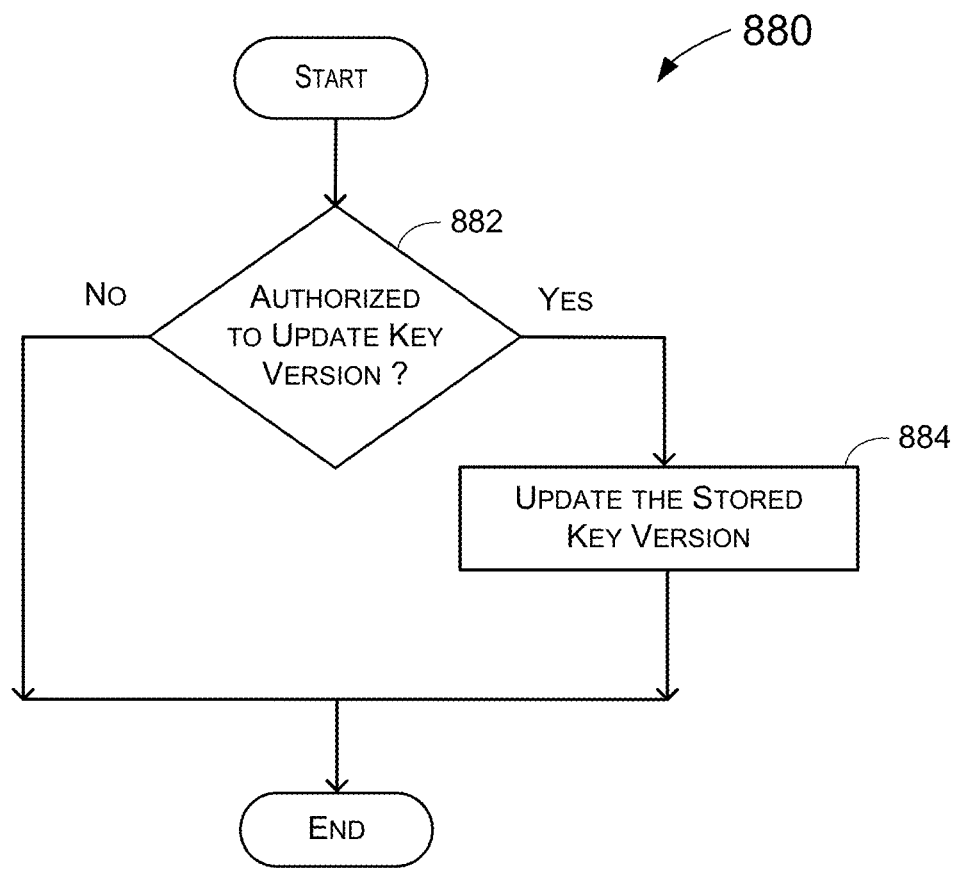
FIG. 8C is a flowchart illustrating a method for updating a key version number according to an embodiment of the disclosed technologies.

FIG. 8C is a flowchart illustrating a method 880 for updating a key version number according to an embodiment of the disclosed technologies. In process 882 in FIG. 8C, the computing device checks to see if a command or authorization has been received from a trusted entity to update the stored version number. The trusted entity can include a system administrator or other trusted entity, which has decided to update the version number. In process 884, if such a command or authorization has been received, the computing device proceeds to update the stored version number. The version update operation is similar to process 807 of method 800 described above in connection with FIG. 8A. If no command or authorization is received, then the stored version number is not updated, and multiple versions of the key can be considered trusted.

In the above descriptions, various memories are used for storing the version numbers. In some embodiments, the persistent memory can be a persistent and immutable memory. In some embodiments, the persistent memory is a fuse-based memory. In other embodiments, the persistent memory is a system boot ROM (read only memory). In some embodiments, the second memory is a fuse-based memory. In some embodiments, the second memory is an electrically erasable programmable non-volatile memory.

In the above embodiments, a new certificate version number is provided with the new digital certificate, and a new key version number is provided with a new secondary public key. In some embodiments, a digital certificate with an associated certificate version number can be used to deliver a secondary public key without a key version number. In other embodiments, a digital certificate without a certificate version number can be used to deliver a secondary public key without an associated a key version number.

Figure 9A:
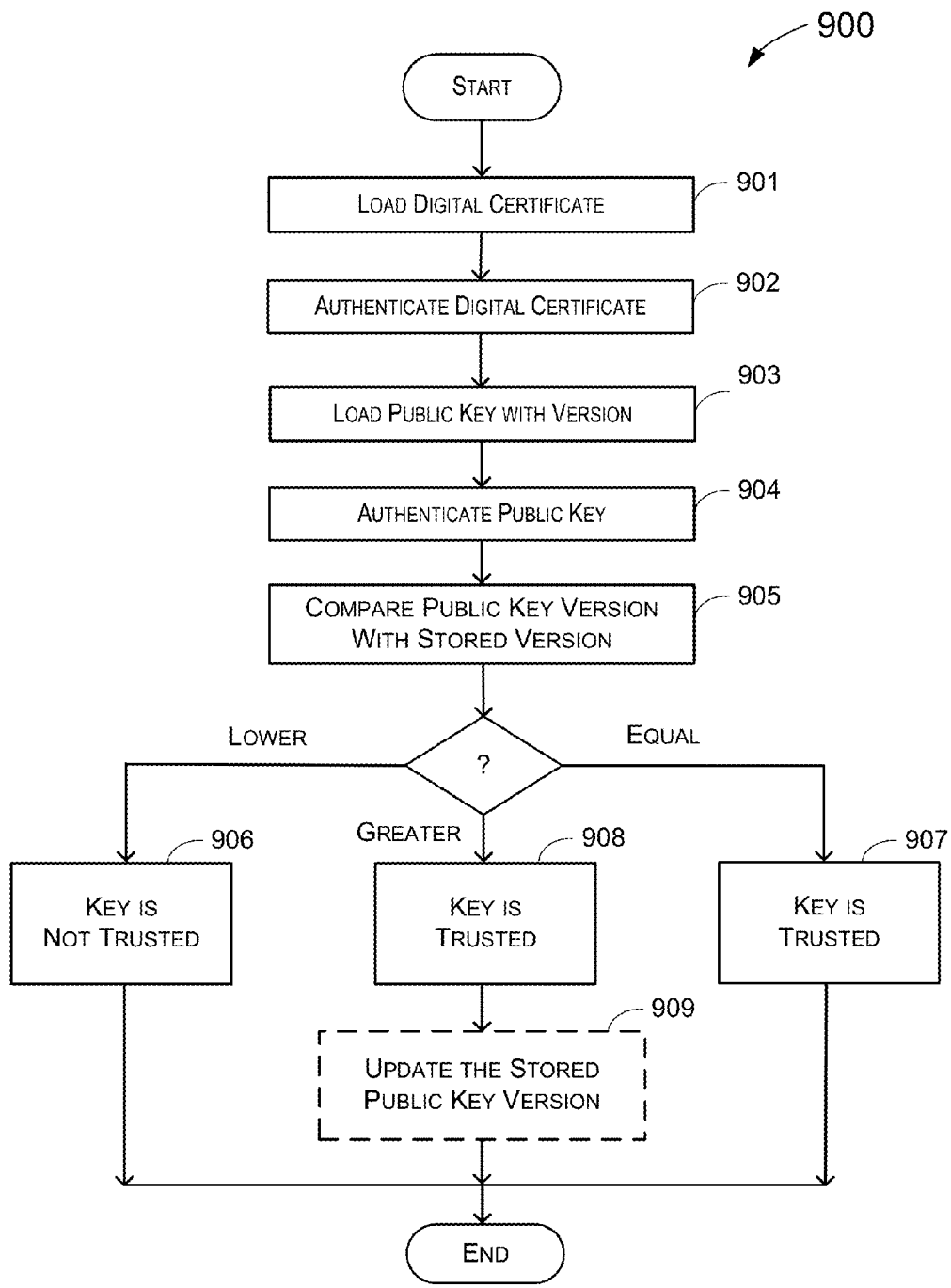
FIG. 9A is a flowchart illustrating a method for authenticating a cryptographic key including a key version number and no certificate version number according to one embodiment of the disclosed technologies.

FIG. 9A is a flowchart illustrating a method for authenticating a cryptographic key including a key version number delivered by a digital certificate without a certificate version number according to an embodiment of the disclosed technologies. Method 900 is summarized below.

Process 901: Load a digital certificate;
Process 902: Authenticate the digital certificate;
Process 903: Load a secondary public key with a key version number;
Process 904: Authenticate the public key;
Process 905: Compare the key version indicator with a stored current version indicator;

Process 906: Determine the key is not a trusted certificate, if the new version indicator is lower;

Process 907: Determine the certificate is a trusted certificate, if the new version indicator is the same as the stored current version indicator;

Process 908: Determine the certificate is a trusted certificate, if the new version indicator is higher; and Process 909: Optionally, update the stored current version indicator with the new version indicator.

In some embodiments, method 900 illustrated in the flowchart in FIG. 9A can be implemented using system 500 shown in FIG. 5. In an embodiment, method 900 can be carried out by computing device 510 in a secure boot process. In processes 901 and 902, a digital certificate is loaded and authenticated. These processes are similar to processes 701 and 702 of method 700 described above for loading and authenticating a digital certificate. In processes 903-908, the processor to authenticate the secondary public key delivered by the digital certificate and check the key version number. Processes 903-908 are similar to processes 801-806 in method 800 described above in connection with FIG. 8A. In method 900, process 909 is an optional process, shown in dotted box in FIG. 9A, of updating the stored key version number. In some embodiments, if the version indicator is higher than the stored current certificate version indicator and the processor determines that the key is a trusted key, the processor updates the corresponding stored current key version indicator in fuse-based memory with the new key version indicator in the digital certificate, similar to process 807 of method 800 in FIG. 8A. In some embodiments, the stored key version number is not updated during the secure boot process, similar to method 850 in FIG. 8B. In this case, the system allows the current stored version number to remain valid, while a new version of the key can also be used.

Figure 9B:
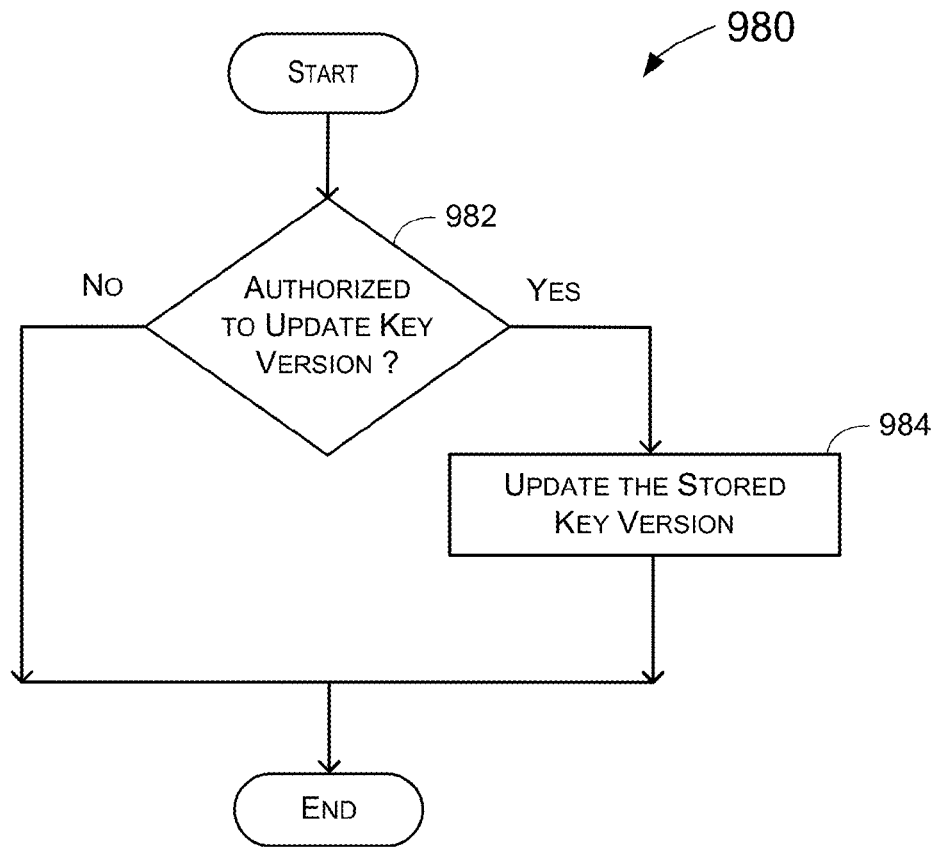
FIG. 9B is a flowchart illustrating a method for updating a key version number according to an embodiment of the disclosed technologies.

FIG. 9B is a flowchart illustrating a method 980 for updating a key version number according to an embodiment of the disclosed technologies. As shown in FIG. 9B, method 980 is similar to method 880 shown in FIG. 8C. In FIG. 9B, in process 982, the processor in the computing device checks to see if a command or authorization has been received from a trusted entity to update the stored version number. The trusted entity can include a system administrator or other trusted entity, which has decided to update the version number. In process 984, if such a command or authorization has been received, the computing device proceeds to update the stored version number. The version update operation is similar to process 807 of method 800 described above in connection with FIG. 8A. If no command or authorization is received, then the stored version number is not updated, and multiple versions of the key can be considered trusted.

Figure 10:
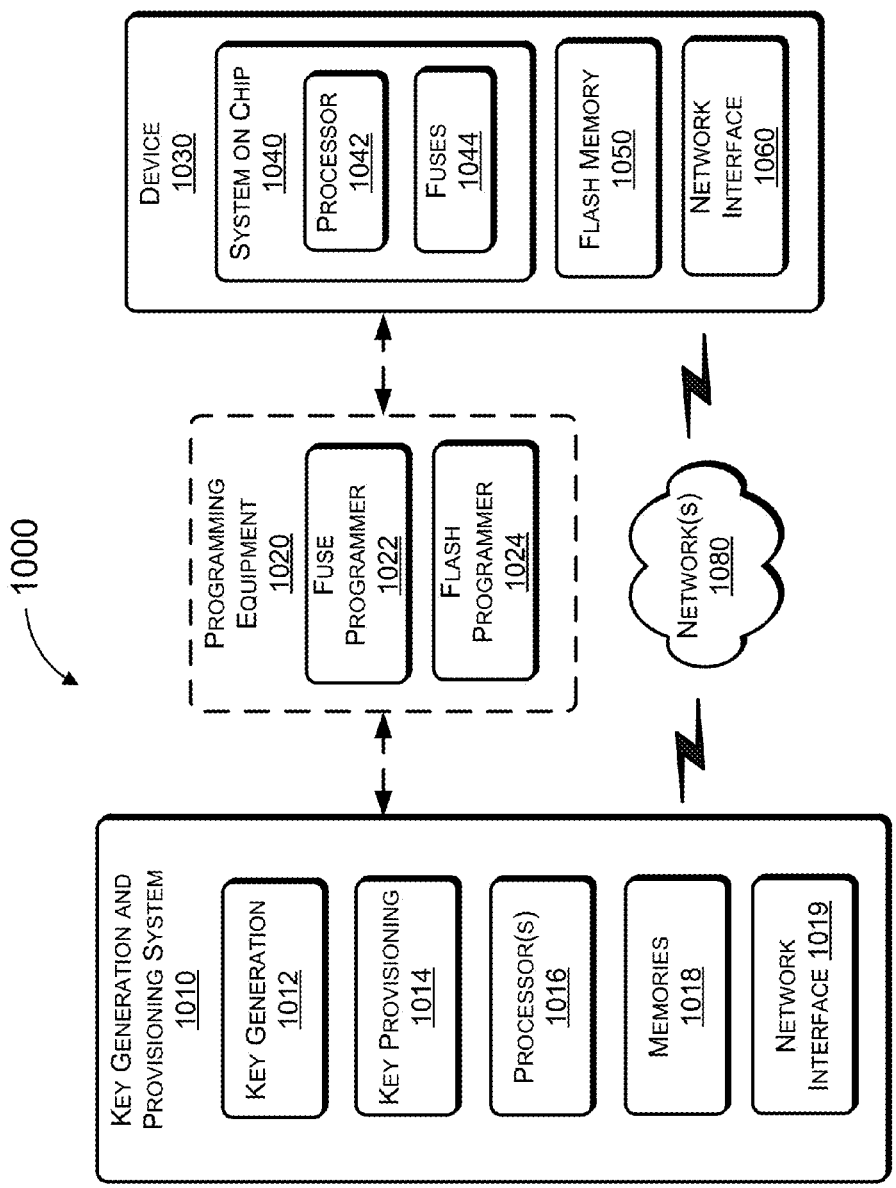
FIG. 10 illustrates an encryption key provisioning system according to one embodiment of the disclosed technologies.

FIG. 10 illustrates a cryptographic key provisioning system according to an embodiment of the disclosed technologies. In FIG. 10, key provisioning system 1000 includes a key generation and provisioning system 1010, programming equipment 1020, and a device 1030 for receiving key provisioning. Key generation and provisioning system 1010 can include a key generation unit 1012, which is configured to generate keys for symmetric and asymmetric cryptography, using known methods. Key generation and provisioning system 1010 can also include a key provisioning unit 1014, which is configured to manage key provisioning activities. In some embodiments, programming equipment 1020 can include a fuse programmer 1022 and a flash programmer 1024, which are used to program the keys generated by the key generation and provisioning system 1010 into a device 1030. As shown in FIG. 10, device 1030 can include a computing device or system-on-chip 1040, which can have a processor 1042 and fuses block 1044. Device 1030 can also have a flash memory 1050 disposed in a second IC chip. For example, device 1030 can represent system 500 in FIG. 5. Key provisioning system 1000 can be configured to implement the various functions. For example, these functions include generating a private key and a public key for an asymmetric cryptographic algorithm, generating a symmetric key for a symmetric cryptographic algorithm, and encrypting the private key using the symmetric key. The functions also include programming a first memory of a computing device with the symmetric key, and programming a second memory with the encrypted private key. These functions also include generating prime numbers or other reduced set of information and program the prime numbers or reduced set of information into a first memory in a computing device to be used for the computing device to derive cryptographic keys.

In addition, as shown in FIG. 10, key provisioning system 1000 can also include components for providing key updating capabilities. In certain instances, the key provisioning system 1000 may detect trigger events for updating the keys for one or more devices. Trigger events may include elapsing of time, completion of a number of transactions by a device, or a potential security compromise in the device or the infrastructure supporting the device, etc. To support the key updating functions, key generation and provisioning system 1010 can include a network interface 1019 for communicating with device 1030 through network(s) 1080. Device 1030 also can have a network interface 1060 for communicating with network 1080. Further, key generation and provisioning system 1010 also includes processor(s) 1016 and memories 1018. In various embodiments, the key provisioning system can be configured to provide key provisioning functions for the various computing devices described above. The programming equipment 1020 in key provisioning system 1000 is shown in broken lines to indicate that the key updating functions performed through network(s) 1080 can be carried out by a key provisioning system or server separate from the key provisioning system that includes the programming equipment. The various key provisioning functions are described below with reference to the flowchart illustrated in FIG. 11A.

Figure 11A:
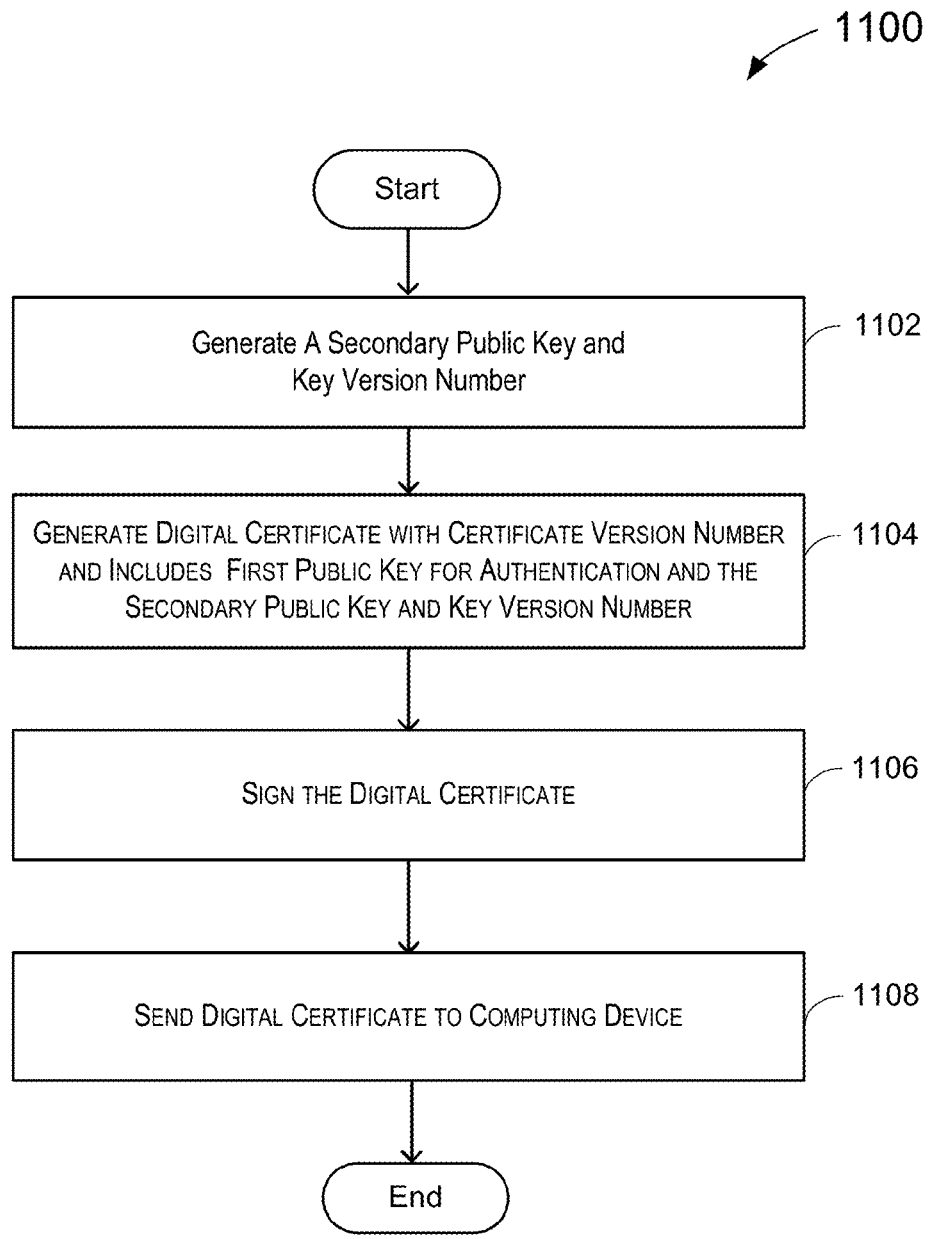
FIG. 11A is a flowchart illustrating a method for generating a digital certificate for delivering a cryptographic key including a certificate version number and a key version number according to an embodiment of the disclosed technologies.

FIG. 11A is a flowchart illustrating a method 1100 for generating a digital certificate for delivering a cryptographic key including a key version number according to one embodiment of the disclosed technologies.

According to some embodiments of the disclosed technologies, a method 1100 is provided for a key provisioning system to deliver a cryptographic key to a computing device. The computing device has a first public key associated with a first asymmetric key pair. The method is summarized in the flowchart illustrated in FIG. 11A and outlined below.

Process 1102: Generate a new secondary public key and key version number;

Process 1104: Generate a digital certificate with a certificate version number including the first public key for authentication and the new secondary public key and key version number;

Process 1106: Sign the digital certificate using first private key associated with the first public key;

Process 1108: Send the digital certificate to the computing device.

In an embodiment, the key provisioning method can be implemented using the key provisioning system 1100 illustrated in FIG. 10. For example, in process 1102, key provisioning system 900 is configured to generate a secondary public key associated with a second asymmetric key pair and a corresponding key version number. In an embodiment, the second asymmetric key pair can be an RSA key pair or an ECC key pair, or other suitable asymmetric key pair. In process 1104, key provisioning system 1000 is configured to generate a digital certificate. In some embodiments, key provisioning system 1000 is also configured to generate a certificate version number associated with the digital certificate. The certificate also includes a corresponding certificate version number and the first public key for the computing device to authenticate the digital certificate. The digital certificate further includes the secondary public key and the corresponding key version number associated with the second public key to be delivered to the computing device. In some embodiments, the certificate version number associated with the digital certificate is higher than a certificate version number sent previously to the computing device, and the key version number associated with the secondary public key is higher than a public key version number sent previously to the computing device. In process 1106, as described above in connection with FIGS. 4-8, key provisioning system 900 is configured to sign the digital certificate. In some embodiments, the signing process can include using a hash algorithm to generate a message digest of a portion of the digital certificate, encrypting the message digest using a first private key associated with the first asymmetric key pair, and including the encrypted message digest in the digital certificate. In process 1108, key provisioning system 1000 is configured to send the digital certificate to the computing device. As described above in connection with FIGS. 4-9B, this digital certificate has the content to allow the computing device to authenticate the digital certificate using the first public key and the certificate version number. Further, after determining the digital certificate to be a trusted certificate, the computing device can extract the second public key and the key version number from the digital certificate. In embodiments of the disclosed technologies, the computing device is configured to authenticate the digital certificate and check the certificate version number to determine whether the digital certificate is considered a trusted certificate. The computing device is further configured to use the key version number to verify whether the second public key can be considered a trusted public key. Depending on the embodiments, the new secondary public key can be used to replace a secondary public key previously sent to the computing device.

In the above embodiment, a new certificate version number is provided with the new digital certificate, and a new key version number is provided with a new secondary public key. In some embodiments, a digital certificate with an associated certificate version number can be used to deliver a secondary public key without a key version number. In other embodiments, a digital certificate without a certificate version number can be used to deliver a secondary public key without an associated a key version number.

Figure 11B:
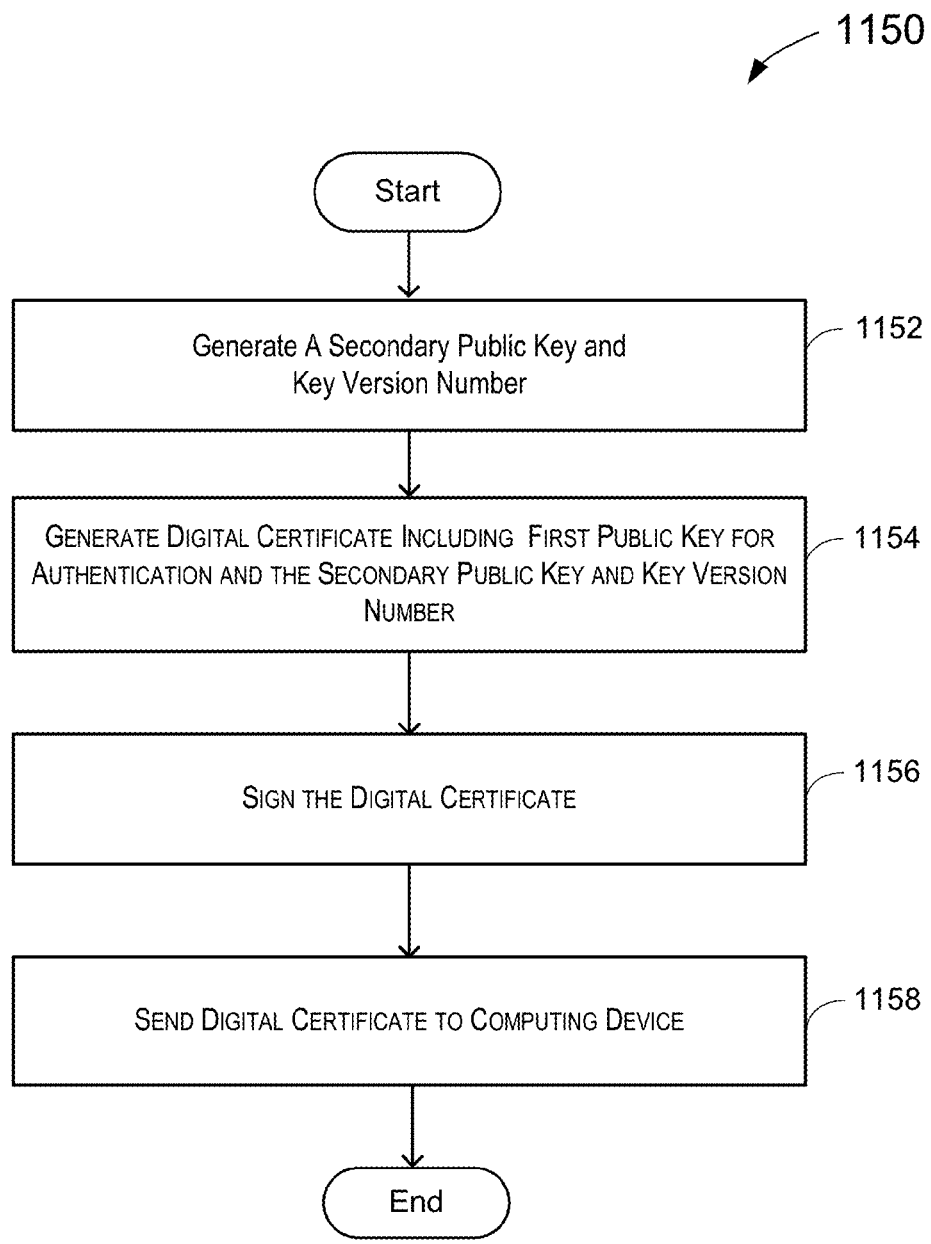
FIG. 11B is a flowchart illustrating a method for generating a digital certificate for delivering a cryptographic key including a key version number according to an embodiment of the disclosed technologies.

FIG. 11B is a flowchart illustrating a method 1150 for generating a digital certificate for delivering a cryptographic key including a key version number according to an embodiment of the disclosed technologies. In this embodiment, the computing device has a first public key associated with a first asymmetric key pair. The method is summarized in the flowchart illustrated in FIG. 11B and outlined below.

Process 1152: Generate a new secondary public key and key version number;
Process 1154: Generate a digital certificate including the first public key for authentication and the new secondary public key and key version number;
Process 1156: Sign the digital certificate using first private key associated with the first public key; and
Process 1158: Send the digital certificate to the computing device.

As shown in FIG. 11B, method 1150 is similar to method 1100 in FIG. 11A described above. A difference is that, in process 1154, no certificate version number is generated with the digital certificate. In this case, the computing device receiving the certificate will check the version number of the secondary public key delivered by the certificate without checking the version number of the certificate, using methods illustrated in FIGS. 9A and 9B.

The processes described herein, or variations and/or combinations thereof, may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 12:
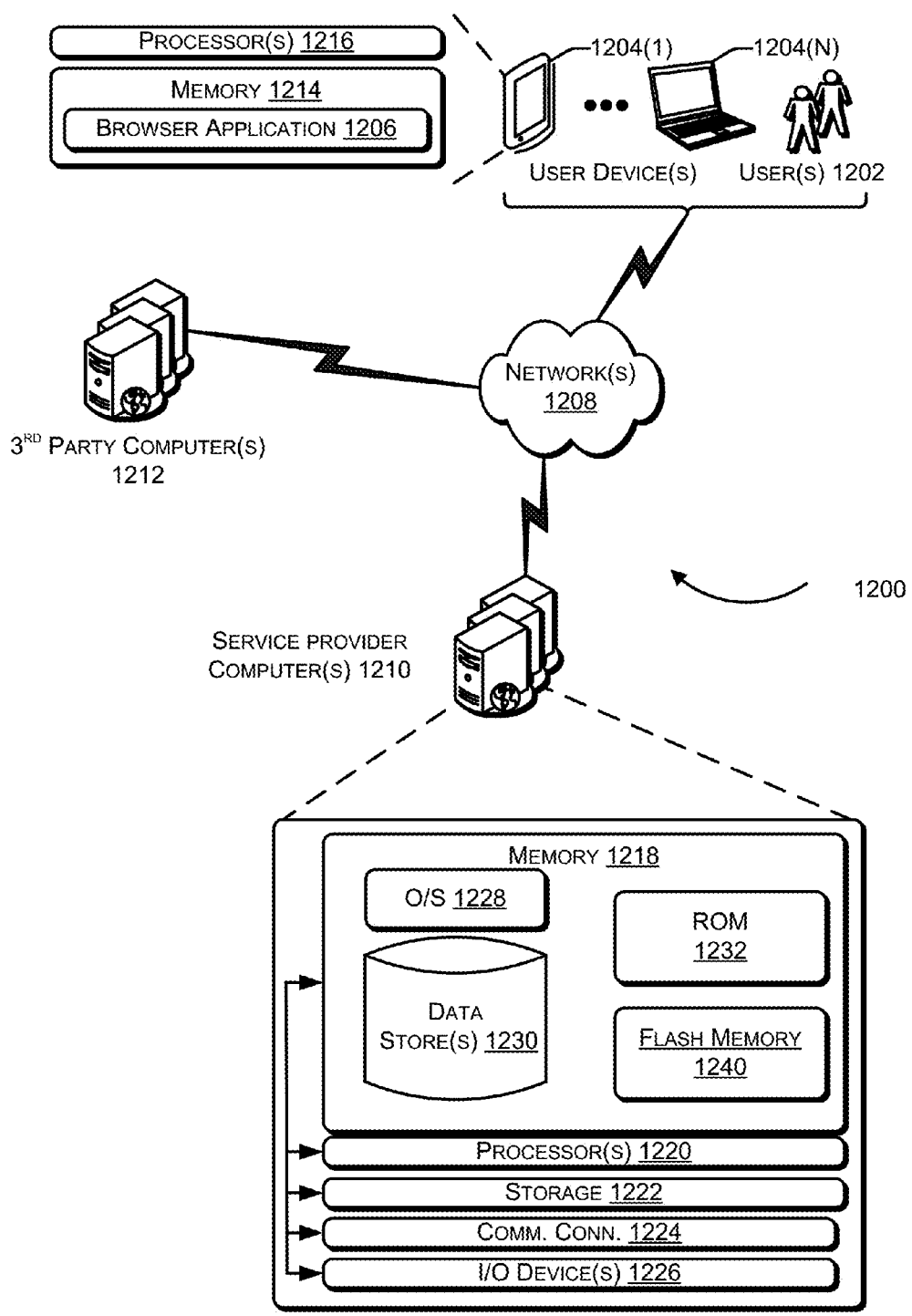
FIG. 12 illustrates an environment in which various embodiments can be implemented.

FIG. 12 illustrates an exemplary architecture for features and systems described herein that includes one or more service provider computers and/or a user device connected via one or more networks, according to at least one exemplary embodiment. The devices discussed in FIGS. 1-11 may use one or more components of the computing devices described in FIG. 12 or may represent one or more computing devices described in FIG. 12. In architecture 1200, one or more users 1202 may utilize user computing devices 1204(1)-(N) (collectively, user devices 1204) to access application 1206 (e.g., a web browser or mobile device application), via one or more networks 12011. In some aspects, application 1206 may be hosted, managed, and/or provided by a computing resources service or service provider. One or more service provider computers 1210 may provide a native application which is configured to run on user devices 1204 which user(s) 1202 may interact with. Service provider computer(s) 1210 may, in some examples, provide computing resources such as, but not limited to, client entities, low latency data storage, durable data storage, data access, management, virtualization, cloud-based software solutions, electronic content performance management, etc. Service provider computer(s) 1210 may also be operable to provide web hosting, computer application development and/or implementation platforms, combinations of the foregoing or the like to user(s) 1202. Service provider computer(s) 1210, in some examples, may communicate with one or more third party computers 1212.

In some examples, network(s) 1208 may include any one or a combination of many different types of networks, such as cable networks, the Internet, wireless networks, cellular networks and other private and/or public networks. While the illustrated example represents user(s) 1202 accessing application 1206 over network(s) 1208, the described techniques may equally apply in instances where user(s) 1202 interact with service provider computer(s) 1210 via user device(s) 1204 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1206 may allow user(s) 1202 to interact with service provider computer(s)

1210 such as to access web content (e.g., web pages, music, video, etc.). Service provider computer(s) 1210, perhaps arranged in a cluster of servers or as a server farm, may host application 1206 and/or cloud-based software services. Other server architectures may also be used to host application 1206. Application 1206 may be capable of handling requests from many users 1202 and serving, in response, various item web pages. Application 1206 can provide any type of website that supports user interaction, including social networking sites, online retailers, informational sites, blog sites, search engine sites, news and entertainment sites, and so forth. As discussed above, the described techniques can similarly be implemented outside of application 1206, such as with other applications running on user device(s) 1204.

User device(s) 1204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1204 may be in communication with service provider computer(s) 1210 via network(s) 1208, or via other network connections. Additionally, user device(s) 1204 may be part of the distributed system managed by, controlled by or otherwise part of service provider computer(s) 1210 (e.g., a console device integrated with service provider computers 1210).

In one illustrative configuration, user device(s) 1204 may include at least one memory 1214 and one or more processing units (or processor(s)) 1216. Processor(s) 1216 may be implemented as appropriate in hardware, computer-executable instructions, firmware, or combinations thereof. Computer-executable instruction or firmware implementations of processor(s) 1216 may include computer-executable or machine-executable instructions written in any suitable programming language to perform the various functions described. User device(s) 1204 may also include geo-location devices (e.g., a global positioning system (GPS) device or the like) for providing and/or recording geographic location information associated with user device(s) 1204.

Memory 1214 may store program instructions that are loadable and executable on processor(s) 1216, as well as data generated during the execution of these programs. Depending on the configuration and type of user device(s) 1204, memory 1214 may be volatile (such as random access memory (RAM)) and/or non-volatile (such as read-only memory (ROM), flash memory, etc.). User device(s) 1204 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, memory 1214 may include multiple different types of memory, such as static random access memory (SRAM), dynamic random access memory (DRAM), or ROM.

Turning to the contents of memory 1214 in more detail, memory 1214 may include an operating system and one or more application programs or services for implementing the features disclosed herein including at least a user provided input element or electronic service web page, such as via browser application 1206 or dedicated applications (e.g., smart phone applications, tablet applications, etc.). Browser application 1206 may be configured to receive, store and/or display a website or other interface for interacting with service provider computer(s) 1210. Additionally, memory 1214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 1204.

In some aspects, service provider computer(s) 1210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1210 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1210 may be in communication with user device(s) 1204 and/or other service providers via network(s) 1208, or via other network connections. Service provider computer(s) 1210 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1210 may include at least one memory 1218 and one or more processing units (or processor(s)) 1220. Processor(s) 1220 may be implemented as appropriate in hardware, computer-executable instructions, firmware, or combinations thereof. Computer-executable instruction or firmware implementations of processor(s) 1220 may include computer-executable or machine-executable instructions written in any suitable programming language to perform the various functions described.

In some instances, hardware processor(s) 1220 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1218 may store program instructions that are loadable and executable on processor(s) 1220, as well as data generated during the execution of these programs. Depending on the configuration and type of service provider computer(s) 1210, memory 1218 may be volatile (such as RAM) and/or non-volatile (such as ROM, flash memory, etc.). Service provider computer(s) 1210 or servers may also include additional storage 1222, which may include removable storage and/or non-removable storage. The additional storage 1222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, memory 1218 may include multiple different types of memory, such as SRAM, DRAM, or ROM.

Memory 1218, the additional storage 1222, both removable and non-removable are all examples of computer-readable storage media. For example, computer-readable storage media may include volatile or non-volatile, removable or non-removable media implemented in any method or technology for storage of information such as computer-readable instructions, data structures, program modules, or other data. Memory 1218 and the additional storage 1222 are all examples of computer storage media. Additional types of computer storage media that may be present in service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1210. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1210 may also contain communications connection(s) 1224 that allow service provider computer(s) 1210 to communicate with a stored database, another computing device or server, user terminals and/or other devices on network(s) 1208. Service provider computer(s) 1210 may also include I/O device(s) 826, such as a keyboard, a mouse, a pen, a voice input device, a touch input device, a display, speakers, a printer, and the like.

Memory 1218 may include an operating system 1228, one or more data stores 1230 and/or one or more application programs or services for implementing the features disclosed herein, including a management buffer 1232 and a logging buffer 1240. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

Figure 13:
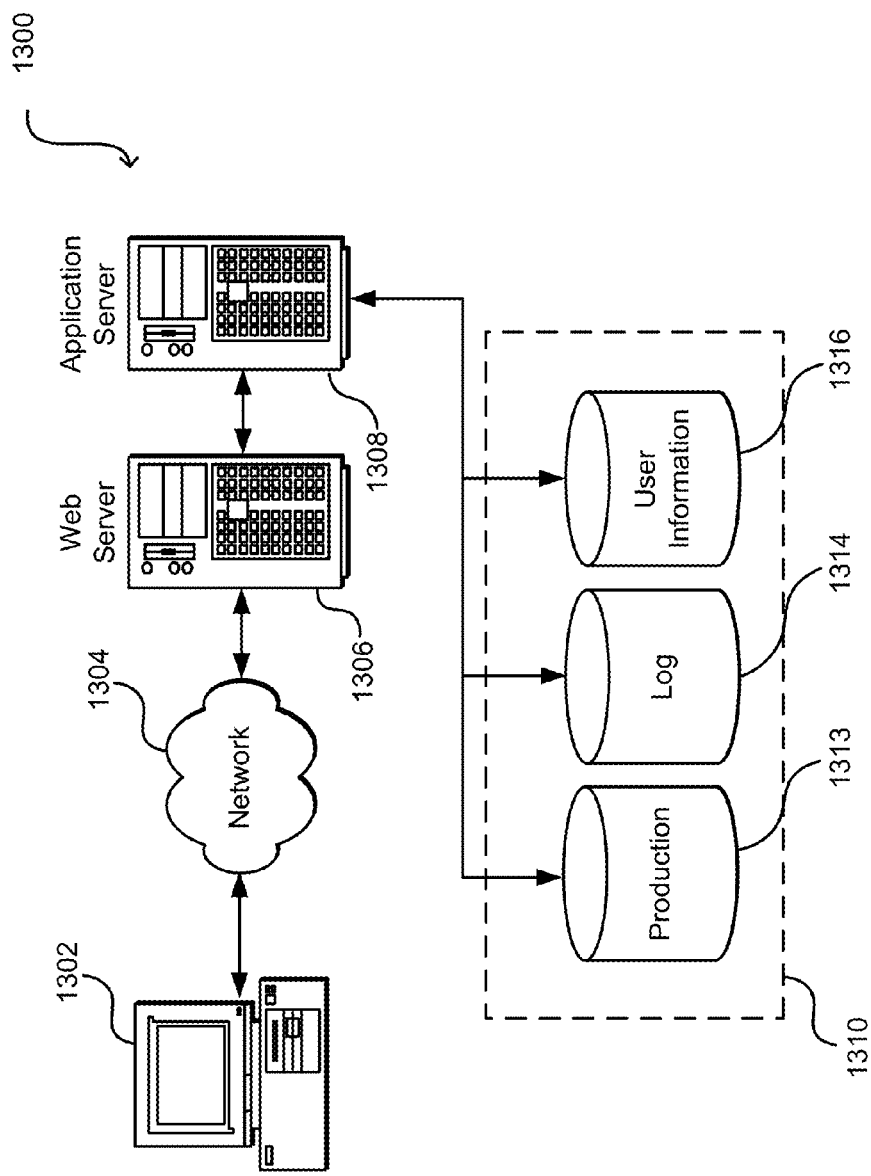
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1313 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system-on-chip, comprising:
    a processor; and
    a fuse-based memory storing:
        information for deriving a first public key associated with a first asymmetric key pair; and
        one or more current certificate version numbers, each associated with a corresponding digital certificate;
    wherein, in a secure boot process, the processor is configured to:
        load a digital certificate that includes a loaded certificate version number associated with the digital certificate and a secondary public key associated with a second asymmetric key pair;
        authenticate the loaded digital certificate using the first public key;
        compare the loaded certificate version number with a corresponding current certificate version number in the fuse-based memory, wherein the loaded certificate version number being equal to or higher than the corresponding current certificate version number indicates that the loaded digital certificate is a trusted certificate; and
        determine that the loaded digital certificate is a trusted certificate;
    wherein the processor is further configured to replace a current certificate version number stored in the fuse-based memory with the loaded certificate version number associated with a trusted digital certificate, thereby preventing a digital certificate with an older certificate version number from being determined as a trusted certificate.

2. The system-on-chip of claim 1, wherein, in the case that the loaded certificate version number is higher than the current certificate version number, the processor is further configured to update the corresponding current certificate version number in the fuse-based memory with the loaded version number.

3. The system-on-chip of claim 1, wherein the fuse-based memory also stores one or more current key version numbers, each associated with a corresponding secondary public key; and
    wherein, after determining the loaded digital certificate to be a trusted certificate, the processor is further configured to:
    compare a key version number associated with the secondary public key of the loaded digital certificate with a corresponding current key version number in the fuse-based memory;
    in the case that the key version number is lower than the corresponding current key version number, determine that the secondary public key is not a trusted public key; and
    in the case that the key version number is equal to or higher than the corresponding current key version number, determine that the secondary public key is a trusted public key.

4. The system-on-chip of claim 3, wherein the processor is further configured to, in the case that the key version number is higher than the current key version number, update the corresponding current key version number in the fuse-based memory to indicate the key version number of the secondary public key.

5. The system-on-chip of claim 1, wherein the processor is further configured to, in the case that the loaded certificate version number is higher than the current certificate version number, update the corresponding current certificate version number in the fuse-based memory with the loaded certificate version number, in response to a command from a trusted entity.

6. A computing device, comprising:
a processor;
a persistent memory for storing information about a first public key associated with a first asymmetric key pair for authenticating a digital certificate; and
a second memory for storing one or more current certificate version indicators, each associated with a corresponding digital certificate, wherein the one or more current certificate version indicators are used by the processor to determine the trust of the corresponding digital certificate;
wherein the processor is further configured to:
receive and authenticate a new trusted digital certificate to replace an old digital certificate that has been compromised; and
replace a current certificate version indicator stored in the second memory with a certificate version indicator of the new trusted digital certificate, thereby preventing a digital certificate with an older certificate version number from being determined as a trusted certificate.

7. The computing device of claim 6, wherein the processor is configured to:
load a digital certificate having a loaded certificate version indicator;
authenticate the loaded digital certificate using the first public key;
compare the loaded certificate version indicator with a corresponding current certificate version indicator in the second memory;
in the case that the loaded certificate version indicator is lower than the current certificate version indicator, determine that the loaded digital certificate is not a trusted certificate; and
in the case that the loaded certificate version indicator is equal to or higher than the current certificate version indicator, determine that the loaded digital certificate is a trusted certificate.

8. The computing device of claim 7, wherein the processor is further configured to, in the case that the loaded certificate version indicator is higher than the current certificate version indicator, update the corresponding current certificate version indicator in the second memory with the loaded certificate version indicator.

9. The computing device of claim 7, wherein the second memory is further configured to store one or more current key version indicators, each associated with a corresponding current secondary public key; and
wherein the processor is further configured to, after determining the loaded digital certificate to be a trusted certificate:
compare a version indicator for a secondary public key provided by the loaded digital certificate with a corresponding current key version indicator stored in the persistent memory;
in the case that the version indicator for the secondary public key is lower than the current key version indicator, determine that the secondary public key is not a trusted public key; and
in the case that the version indicator for the secondary public key is equal to or higher than the current key version indicator, determine that the secondary public key is a trusted public key.

10. The computing device of claim 9, wherein the processor is further configured to, in the case that the version indicator for the secondary public key is higher than the current key version indicator, update the corresponding current key version indicator in the persistent memory to indicate the version indicator for the secondary public key.

11. The computing device of claim 7, wherein the processor is further configured to, in the case that the loaded certificate version indicator is higher than the current certificate version indicator, update the corresponding current certificate version indicator in the persistent memory with the loaded certificate version indicator, in response to a command from a trusted entity.

12. The computing device of claim 6, wherein, in the case that the loaded certificate version indicator is higher than the current certificate version indicator, the processor is further configured to update the corresponding current certificate version indicator in the second memory with the loaded certificate version indicator, in response to a command from a trusted entity.

13. The computing device of claim 6, wherein the information about the first public key comprises a symmetric key configured for decrypting an encrypted version of the first public key.

14. The computing device of claim 6, wherein the information about the first public key comprises prime numbers for deriving the first public key.

15. The computing device of claim 6, wherein the persistent memory is a fuse-based memory or a system boot ROM (read only memory).

16. The computing device of claim 6, wherein the second memory is a fuse-based memory or is an electrically erasable programmable non-volatile memory.

17. A method for generating a digital certificate for a computing device, the computing device having a first public key associated with a first asymmetric key pair for authenticating a digital certificate, the method comprising:
generating a second public key associated with a second asymmetric key pair and a corresponding key version number;
generating a digital certificate including a certificate version number and the first public key, the generated digital certificate further including the second public key and the corresponding key version number associated with the second public key;
signing the generated digital certificate; and
sending the generated digital certificate to the computing device, wherein the computing device is configured to:
authenticate the generated digital certificate using the first public key and the certificate version number;
extract the second public key and the key version number from the generated digital certificate; and
authenticate the second public key using the corresponding key version number associated with the second public key.

18. The method of claim 17, wherein signing the generated digital certificate comprises:
using a hash algorithm to generate a message digest of at least a portion of the generated digital certificate;

encrypting the message digest using a first private key associated with the first asymmetric key pair; and including the encrypted message digest in the generated digital certificate.

19. The method of claim 17, wherein the certificate version number associated with the generated digital certificate is higher than a certificate version number sent previously to the computing device.

20. The method of claim 17, wherein the key version number associated with the secondary public key is higher than a public key version number sent previously to the computing device.

* * * * *